United States Patent
Maeda et al.

(10) Patent No.: US 8,593,443 B2
(45) Date of Patent: *Nov. 26, 2013

(54) DISPLAY DEVICE

(75) Inventors: Kazuhiro Maeda, Osaka (JP); Ichiro Shiraki, Osaka (JP); Hiroaki Sugiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 360 days.

This patent is subject to a terminal disclaimer.

(21) Appl. No.: 13/061,545

(22) PCT Filed: Jul. 7, 2009

(86) PCT No.: PCT/JP2009/062354
§ 371 (c)(1),
(2), (4) Date: Mar. 1, 2011

(87) PCT Pub. No.: WO2010/026830
PCT Pub. Date: Mar. 11, 2010

(65) Prior Publication Data
US 2011/0149174 A1    Jun. 23, 2011

(30) Foreign Application Priority Data
Sep. 2, 2008 (JP) .................................. 2008-224931

(51) Int. Cl.
*G06F 3/038* (2013.01)

(52) U.S. Cl.
USPC ........................... 345/207; 250/208.1; 349/50

(58) Field of Classification Search
USPC .................. 345/204, 207, 214; 348/739, 366; 349/28, 50, 116; 250/208.1
See application file for complete search history.

(56) References Cited

U.S. PATENT DOCUMENTS 6,163,023 A    12/2000  Watanabe
8,068,190 B2 *  11/2011  Maeda et al. ................... 349/49

(Continued)

FOREIGN PATENT DOCUMENTS

JP    9-247536 A    9/1997
JP    10-93066 A    4/1998

(Continued)

OTHER PUBLICATIONS

English translation of Official Communication issued in corresponding Russian Patent Application No. 2011112789, mailed on Nov. 2, 2011.

(Continued)

*Primary Examiner* — Abbas Abdulselam
(74) *Attorney, Agent, or Firm* — Keating & Bennett, LLP

(57) ABSTRACT

A display device includes a photosensor (81) in a pixel region (1) of an active matrix substrate (100). The photosensor (81) includes a photodetection element, reset signal wiring that supplies a reset signal RS to the photosensor (81), readout signal wiring that supplies a readout signal RW to the photosensor (81), and a sensor switching element for reading out the potential of the storage node to output wiring as sensor circuit output, the potential of the storage node having changed in accordance with the amount of light received by the photodetection element in a sensing period, the sensing period being from when the reset signal is supplied until when the readout signal is supplied. The potential of wiring having a parasitic capacitance with the storage node is fixed to a predetermined potential V0 at least either one of immediately before the readout signal RW and immediately before the reset signal RS.

7 Claims, 21 Drawing Sheets

(56) References Cited

U.S. PATENT DOCUMENTS

| | | | |
|---|---|---|---|
| 8,355,015 B2 * | 1/2013 | Kimura et al. | 345/212 |
| 2004/0008172 A1 | 1/2004 | Nakamura et al. | |
| 2005/0045881 A1 | 3/2005 | Nakamura et al. | |
| 2005/0057552 A1 | 3/2005 | Foo et al. | |
| 2005/0258337 A1 | 11/2005 | Ozawa | |
| 2006/0256093 A1 | 11/2006 | Furukawa et al. | |

FOREIGN PATENT DOCUMENTS

| | | |
|---|---|---|
| JP | 11-177886 A | 7/1999 |
| JP | 2004-45879 A | 2/2004 |
| JP | 2006-3857 A | 1/2006 |
| JP | 2006-317682 A | 11/2006 |
| RU | 2289887 C2 | 12/2006 |
| RU | 2319991 C1 | 3/2008 |
| WO | 2007/145346 A1 | 12/2007 |
| WO | 2007/145347 A1 | 12/2007 |

OTHER PUBLICATIONS

Official Communication issued in International Patent Application No. PCT/JP2009/062354, mailed on Oct. 27, 2009.

* cited by examiner

DISPLAY DEVICE

TECHNICAL FIELD

The present invention relates to a display device with a photosensor that has a photodetection element such as a photodiode or a phototransistor, and in particular relates to a display device including a photosensor in a pixel region.

BACKGROUND ART

Conventionally, there has been proposed a display device with a photosensor that, due to including a photodetection element such as a photodiode inside a pixel, can detect the brightness of external light and pick up an image of an object that has come close to the display. Such a display device with a photosensor is envisioned to be used as a bidirectional communication display device or display device with a touch panel function.

In a conventional display device with a photosensor, when using a semiconductor process to form known constituent elements such as signal lines, scan lines, TFTs (Thin Film Transistors), and pixel electrodes on an active matrix substrate, photodiodes or the like are formed at the same time on the active matrix substrate (e.g., see PTL 1).

FIG. 25 shows an example of a conventional photosensor (e.g., see PTL 2 and 3) formed on an active matrix substrate. The conventional photosensor shown in FIG. 25 is configured by a photodiode D1, a capacitor C2, and a transistor M2. The anode of the photodiode D1 is connected to wiring for supplying a reset signal RS. The cathode of the photodiode D1 is connected to one of the electrodes of the capacitor C2 and the gate of the transistor M2. The drain of the transistor M2 is connected to wiring for supplying a constant voltage Vsup. Note that sensor circuit output data SData of the photosensor is output from the source of the transistor M2. The other electrode of the capacitor C2 is connected to wiring for supplying a readout signal RW.

In this configuration, sensor circuit output data SData that is in correspondence with the amount of light received by the photodiode D1 can be obtained by supplying the reset signal RS and the readout signal RW in accordance with respective predetermined timings. Next is a description of the operation of the conventional photosensor shown in FIG. 25, with reference to FIG. 26. Note that in FIG. 26, the low level (e.g., −4 V) of the reset signal RS is indicated as $-V_b$, and the high level (e.g., 8 V) of the readout signal RW is indicated as $V_{rw}$. It should also be noted that the high level of the reset signal RS is considered to be 0 V, and the low level of the readout signal RW is considered to be 0 V.

A sensing sequence of the photosensor shown in FIG. 25 is described below in three parts, namely (A) readout period, (B) reset period, and (C) sensing period.

(A) Readout Period

The readout period corresponds to the period in which the readout signal RW is at the high level. While the readout signal RW is at the high level, the potential VINE of a storage node is "pulled up" via the capacitor C2. Note that the storage node is a connection point between the capacitor C2, the cathode of the photodiode D1, and the gate of the transistor M2. At this time, letting the storage node potential immediately before readout be $V_0$, the capacitance of the capacitor C2 be $C_{st}$, the total in-circuit capacitance be $C_{total}$, and the amplitude of the readout signal RW be $V_{rw}$, the potential $V_{INT}$ of the storage node can be obtained by the below expression.

$$V_{INT} = C_{st}/C_{total} V_{rw} + V_0$$

Then, due to the "pulled-up" potential VINE exceeding the threshold value of the transistor M2, the transistor M2 is turned on, and the sensor data SData is output. At this time, letting the threshold value of the transistor M2 be $V_{th}$, the current value of a constant current source be I, and the conductance of the transistor M2 be β, the potential $V_{out}$ of SData can be obtained by the below expression.

$$V_{out} \approx V_{INT} - V_{th}(2I/\beta)^{1/2}$$

(B) Reset Period

Due to the reset signal RS rising to the high level (0 V), a forward current flows to the photodiode D1, and the potential $V_{INT}$ of the storage node is reset to 0 V.

(C) Sensing Period

The sensing period starts when the reset signal has returned from the high level to the low level. In other words, after the storage node has been reset in the reset period as mentioned above, the reset signal RS falls to the low level ($-V_b$), and thus the photodiode D1 becomes reverse biased. Then, the storage node changes to the $-V_b$ direction due to a photocurrent that is in accordance with the amount of light that has been incident on the photodiode D1.

The above-described (A) readout period, (B) reset period, and (C) sensing period are considered to be one cycle, and sensor data is read out from the photosensor by repeatedly performing this cycle.

FIG. 27 shows an example of a configuration of a photosensor inside a pixel. In the exemplary configuration shown in FIG. 27, one sensor circuit 81 is provided in each pixel configured by three colors of picture elements, namely red (r), green (g), and blue (b). Among the constituent elements shown in FIG. 25, the sensor circuit 81 corresponds to the photodiode D1, the capacitor C2, and the transistor M2. In the example in FIG. 27, gate lines GL and source lines SL are arranged in a matrix, and TFTs 83 for driving pixel electrodes 82r, 82g, and 82b of the picture elements are arranged at intersections between the gate lines GL and the source lines SL. The gates of the TFTs 83 are connected to the gate lines GL, the sources thereof are connected to the source lines SL, and the drains thereof are connected to the pixel electrodes 82r, 82g, and 82b. Note that in the example in FIG. 27, the three pixel electrodes 82r, 82g, and 82b make up one unit, and are repeatedly disposed along the row direction.

The number of gate lines GL provided on the matrix substrate is L. In other words, the number of pixels on the matrix substrate in the row direction is L. The gate lines GL are indicated as GL(l) (l is a natural number from 1 to L) when there is a need to distinguish between individual gate lines GL. Source lines SLr, SLg, and SLb make up one set of source lines SL, and M sets (i.e., 3M lines) are provided on the matrix substrate. In other words, the number of pixels on the matrix substrate in the column direction (horizontal direction) is M, and the number of picture elements in the column direction is 3M. Hereinafter, the source lines SL are indicated as SLr(m), SLg(m), and SLb(m) when there is a need to distinguish between individual source lines SL. Specifically, m is a natural number from 1 to M.

Note that N wiring lines for supplying the above-described reset signal RS and readout signal RW to the sensor circuits 81 are provided as a control signal line group RCTL for driving the sensor circuits 81. Note that there are cases where N is equal to L, which is the number of gate lines GL, and cases where N is less than L. For example, in a configuration in which the sensor circuit 81 is provided in all pixels in the row direction (vertical direction), N is equal to L, and in the example where the sensor circuit 81 is provided in every other pixel in the row direction, N is equal to L/2.

Also, in the example in FIG. 27, a power supply line Vsup that supplies power to the sensor circuit 81 is provided between the source lines SLg(m) and SLb(m). Furthermore, output wiring SData for outputting data from the sensor circuit 81 is provided between the source lines SLr(m) and SLg(m).

A configuration is also possible in which, as shown in FIG. 28, any of the source lines SL (in the example in FIG. 28, SLr(m) and SLg(m)) also serve as the power supply line Vsup and the output wiring SData. In this configuration, although there is a constraint in terms of timing in that sensor driving needs to be executed in a period in which the source lines SL are not used in a video display operation (e.g., the blanking period), there is the advantage of having a high pixel aperture ratio since the number of wiring lines is reduced. Specifically, in the configuration shown in FIG. 28, a video signal is applied to the source lines SL while a video display operation is performed. On the other hand, during sensor driving (e.g., the blanking period), a switch is switched to cause a constant voltage to be supplied from the power supply to the source line SLg(m), thus causing this source line to function as the power supply line Vsup. Similarly, a switch is switched to cause sensor circuit output data to be output from the sensor circuit 81 to the source line SLr(m). Accordingly, this source line functions as the output wiring SData during sensor driving.

CITATION LIST

Patent Literature

PTL 1: JP 2006-3857A
PTL 2: WO 2007/145346
PTL 3: WO 2007/145347

DISCLOSURE OF INVENTION

In the above-described conventional sensor circuit 81, as shown in FIG. 25, parasitic capacitances Cps and Cpd respectively exist between the storage node (the connection point between the cathode of the photodiode and the capacitor) and the power supply line Vsup that supplies power to the sensor circuit 81, and between the storage node and the output wiring SData. For this reason, if the potential of such wiring fluctuates between the time when the sensor circuit 81 is being reset and the time when data is being read out from, the difference in potential propagates to the storage node via the parasitic capacitances and causes the potential $V_{INT}$ of the storage node to fluctuate. This results in the problem that offset noise appears in the output from the sensor circuit 81.

Next is a specific description of a situation in which offset noise appears in output from the sensor circuit 81 with reference to FIGS. 29 and 30.

FIG. 29 is an equivalent circuit diagram showing a configuration in which the power supply line Vsup and the output wiring SData are provided independently from the source lines SL as shown in FIG. 27, with only the sensor circuit 81 and the wiring groups necessary for driving the sensor circuit 81 being shown. As shown in FIG. 29, in this configuration, the power supply line Vsup and the output wiring SData are shared by all of the sensor circuits 81 lined up in the same column.

Even if the transistor M2 (see FIG. 25) in the sensor circuit 81 are in the OFF state, the parasitic capacitances (Cps and Cpd) exist between the gate and source of the transistor M2 and between the gate and drain of the transistor M2. Also, depending on the layout, there is the possibility of the existence of a coupling capacitance and a fringe capacitance between the storage node and the output wiring SData, and between the storage node and the power supply line Vsup. Here, letting Ctotal be the total capacitance including that of the parasitic capacitances connected to the storage node, electrical noise Noise_SD that the output wiring SData generates in the storage node is expressed by the below expression. Note that V_SData shown below indicates the fluctuation in the potential of the output wiring SData.

$$\text{Noise}\_SD = Cps/Ctotal \cdot V\_SData \quad (1)$$

In the configuration shown in FIG. 29, in the case where reset, sensing, and readout are performed repeatedly, even if the amount of light that is incident on the photodiode D1 is constant, the sensor circuit output data that is read out to the output wiring SData fluctuates as shown in FIG. 30 due to being influenced by the potential of the output wiring SData immediately before the readout signal RW and the reset signal RS (Vs1, Vw2, Vs2, . . . shown in FIG. 30). Note that the potential Vs1, Vw2, Vs2, . . . of the output wiring SData is dependent on the potential of the immediately previous sensor circuit output data.

Note that in the timing chart shown in FIG. 30, the timing according to which the readout signal RW and the reset signal RS are supplied to the same sensor circuit 81 is considered to be constant in the vertical periods. Accordingly, the period from after the trailing edge of a pulse 1 of the reset signal RS until when a pulse 2 of the readout signal RW has been applied in the next vertical period corresponds to the sensing period of the sensor circuit 81 in which that reset signal RS and that readout signal RW are applied.

Here, even if the amount of light that is incident on the photodiode D1 in the respective sensing periods is the same between the sensor circuit output data read out due to the pulse 2 of the readout signal RW in FIG. 30 and the sensor circuit output data read out due to a pulse 3 of the readout signal RW, the below offset Voff2-3 occurs due to the parasitic capacitances. This expression is derived from the above-described expression (1).

$$Voff2\text{-}3 = Cps/Ctotal \cdot \{(Vs1-Vw2)-(Vs2-Vw3)\}$$

Also, even if the amount of light that is incident on the photodiode D1 in the respective sensing periods is the same between the sensor circuit output data read out due to the pulse 3 of the readout signal RW and the sensor circuit output data read out due to a pulse 4 of the readout signal RW, the below offset Voff3-4 occurs due to the parasitic capacitances.

$$Voff3\text{-}4 = Cps/Ctotal \cdot \{(Vs2-Vw3)-(Vs3-Vw4)\}$$

As previously mentioned, the potential Vs1, Vw2, Vs2, . . . of the output wiring SData is dependent on the potential of the immediately previous sensor circuit output data (i.e., the output data from the sensor circuit in the previous row of the same column). Accordingly, the offset Voff2-3 and the offset Voff3-4 are not necessarily constant. As described above, even if the amount of light that is incident on the photodiode D1 is constant, the sensor circuit output data has an offset originating from the fluctuation in the potential of the output wiring SData immediately before the readout signal RW and the reset signal RS. Also, as mentioned above, the offset is not constant, and therefore cannot be simply eliminated.

In a configuration in which some of the source lines SL also serve as the power supply line Vsup and the output wiring SData as shown in FIG. 28, the offset originating from fluctuation in the potential of the output wiring SData as well as the offset originating from fluctuation in the potential of the power supply line Vsup is superimposed on the sensor circuit output data. There is no fluctuation in the potential of the power supply line Vsup in the configuration shown in FIGS. 27 and 30, whereas in the configuration shown in FIG. 28, the power supply line Vsup also serve as a source lines SL, and therefore the potential fluctuates due to a video signal being applied in the image display period.

In light above the above-described problems, an object of the present invention is to provide a display device with a photosensor that can obtain highly precise sensor circuit output data by solving the problem of offset at the storage node originating from a parasitic capacitance.

In order to solve the above-described problem, a display device according to the present invention is a display device including a photosensor in a pixel region of an active matrix substrate, the photosensor including: a photodetection element that receives incident light; a storage node that is connected to the photodetection element, the potential of the storage node changing in accordance with an output current from the photodetection element; reset signal wiring that supplies a reset signal to the photosensor; readout signal wiring that supplies a readout signal to the photosensor; and a sensor switching element for reading out the potential of the storage node to output wiring as sensor circuit output, the potential of the storage node having changed in accordance with the amount of light received by the photodetection element in a sensing period, the sensing period being from when the reset signal is supplied until when the readout signal is supplied, wherein the potential of wiring having a parasitic capacitance with the storage node is fixed to a predetermined potential at least either one of immediately before the readout signal and immediately before the reset signal.

The present invention enables providing a display device with a photosensor that can obtain highly precise sensor circuit output data by solving the problem of offset at the storage node originating from a parasitic capacitance.

DESCRIPTION OF THE INVENTION

Figure 1:
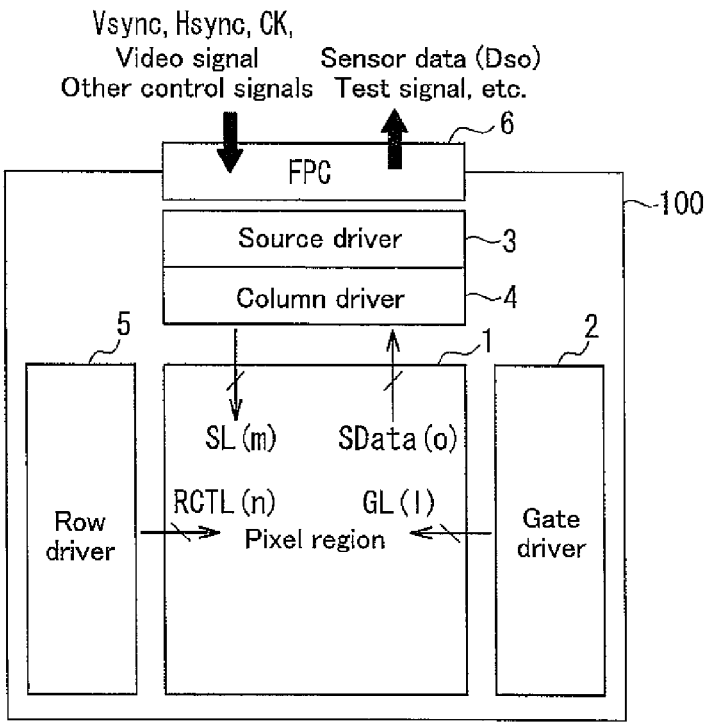
FIG. 1 is a block diagram showing a schematic configuration of a display device according to an embodiment of the present invention.

A display device according to an embodiment of the present invention is a display device including a photosensor in a pixel region of an active matrix substrate, the photosensor including; a photodetection element that receives incident light; a storage node that is connected to the photodetection element, the potential of the storage node changing in accordance with an output current from the photodetection element; reset signal wiring that supplies a reset signal to the photosensor; readout signal wiring that supplies a readout signal to the photosensor; and a sensor switching element for reading out the potential of the storage node to output wiring as sensor circuit output, the potential of the storage node having changed in accordance with the amount of light received by the photodetection element in a sensing period, the sensing period being from when the reset signal is supplied until when the readout signal is supplied, wherein the potential of wiring having a parasitic capacitance with the storage node is fixed to a predetermined potential at least either one of immediately before the readout signal and immediately before the reset signal.

According to this configuration, fixing the potential of the wiring having a parasitic capacitance with the storage node to a predetermined potential in at least either one of immediately before the readout signal and immediately before the reset signal enables preventing the potential of the storage node from fluctuating due to fluctuation in potential originating from the potential of the wiring immediately before readout from the photosensor and/or immediately before resetting. This enables providing a display device with a photosensor in which offset at the storage node originating from a parasitic capacitance is solved, and highly precise sensor circuit output data can be obtained.

Note that a configuration is preferable in which the wiring having a parasitic capacitance with the storage node is the output wiring. The potential of the output wiring fluctuates in accordance with, for example, the immediately previous sensor circuit output data, and depending on the circuit configuration, the level of the immediately previous video signal. Moreover, the amount of fluctuation cannot be predicted. Accordingly, fixing the potential of this wiring to a predetermined potential at least either immediately before the readout signal or immediately before the reset signal enables solving the offset at the storage node originating from a parasitic capacitance. Furthermore, in this configuration, it is preferable that a video signal having a predetermined level is supplied to the output wiring in order to fix the potential of the output wiring to the predetermined potential.

Also, a configuration is preferable in which the wiring having a parasitic capacitance with the storage node is power supply wiring that supplies a power supply voltage to the photosensor in a period in which the readout signal is being supplied, and the power supply wiring also serves as a source line that supplies a video signal to a pixel in the pixel region. With this configuration, the potential of the power supply wiring fluctuates in accordance with the level of the video signal supplied to the pixels. Moreover, the amount of fluctuation cannot be predicted. Accordingly, fixing the potential of this power supply wiring to a predetermined potential at least either immediately before the readout signal or immediately before the reset signal enables solving the offset at the storage node originating from a parasitic capacitance. Furthermore, in this configuration, it is preferable that fixing of the potential of the power supply wiring to the predetermined potential is controlled by a signal different from the readout signal.

Also, it is preferable that a video signal having a predetermined level is supplied to the output wiring in order to fix the potential of the output wiring to a first predetermined potential immediately before the readout signal, and a voltage having a predetermined level is supplied to the output wiring in order to fix the potential of the output wiring to a second predetermined potential immediately before the reset signal.

Also, the display device of the present invention can be favorably implemented as a liquid crystal display device further including a common substrate opposing the active matrix substrate, and liquid crystal sandwiched between the active matrix substrate and the common substrate.

Below is a description of more specific embodiments of the present invention with reference to the drawings. Note that although the following embodiments show examples of configurations in which a display device according to the present invention is implemented as a liquid crystal display device, the display device according to the present invention is not limited to a liquid crystal display device, and is applicable to an arbitrary display device that uses an active matrix substrate. It should also be noted that due to having a photosensor, the display device according to the present invention is envisioned to be used as, for example, a display device with a touch panel that performs input operations by detecting an object that has come close to the screen, or a bidirectional communication display device that is equipped with a display function and an image capture function.

Also, for the sake of convenience in the description, the drawings that are referenced below show simplifications of, among the constituent members of the embodiments of the present invention, only relevant members that are necessary for describing the present invention. Accordingly, the display device according to the present invention may include arbitrary constituent members that are not shown in the drawings that are referenced in this description. Also, regarding the dimensions of the members in the drawings, the dimensions of the actual constituent members, the ratios of the dimensions of the members, and the like are not shown faithfully.

Embodiment 1

Figure 2:
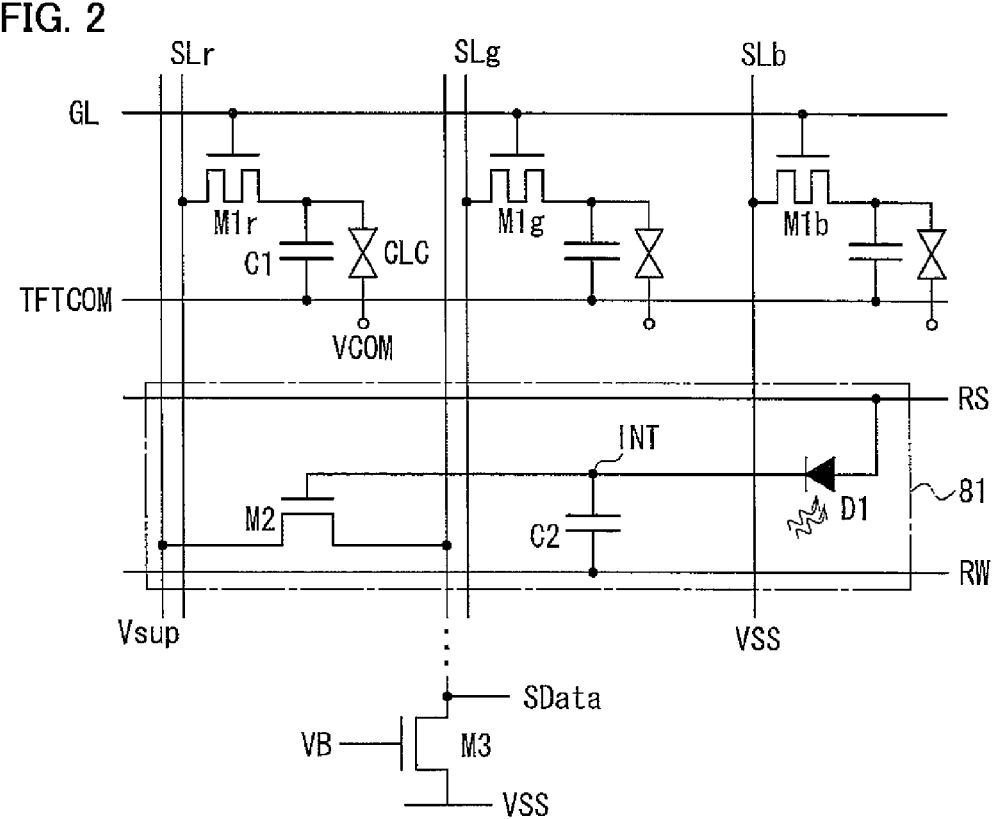
FIG. 2 is an equivalent circuit diagram showing a configuration of a pixel in a display device according to an embodiment of the present invention.

First is a description of a configuration of an active matrix substrate included in a liquid crystal display device according to Embodiment 1 of the present invention with reference to FIGS. 1 and 2.

FIG. 1 is a block diagram showing a schematic configuration of an active matrix substrate 100 included in the liquid crystal display device according to an embodiment of the present invention. As shown in FIG. 1, the active matrix substrate 100 includes at least a pixel region 1, a gate driver 2, a source driver 3, a column driver 4, and a row driver 5 on a glass substrate. Note that although not shown in FIG. 1, a signal processing circuit for processing image signals picked up by photodetection elements (described later) in the pixel region 1 is connected to the active matrix substrate 100 via an FPC 6.

In accordance with synchronization signals (Vsync and Hsync) that have been input from the outside, the gate driver 2 and the source driver 3 perform scanning for writing a video signal, which has been likewise input from the outside, to display pixels in the pixel region 1. On the other hand, the column driver 4 and the row driver 5 are drivers for supplying various types of signals necessary for sensor driving (the later-described readout signal, reset signal, and the like) to photosensors in the pixel region 1, and sequentially outputting sensor circuit output data that has been read out, to the outside of the display device.

Note that the arrangement of the various types of drivers shown in FIG. 1 is merely an example, and how the various types of drivers are mounted is arbitrary design matter. Also, the above-described constituent members on the active matrix substrate 100 can be formed monolithically on the glass substrate by a semiconductor process. Alternatively, a configuration is possible in which an amplifier and the various drivers among the above-described constituent members are mounted on the glass substrate by COG (Chip On Glass) technology or the like. As another alternative, it is conceivable for at least some of the above-described constituent members shown on the active matrix substrate 100 in FIG. 1 to be mounted on the FPC. The active matrix substrate 100 is attached to a common substrate (not shown) that has a common electrode formed on the entire face thereof, and a liquid crystal material is enclosed in the gap therebetween.

The pixel region 1 is a region in which a plurality of pixels are formed in order to display an image. In the present embodiment, a photosensor (sensor circuit 81) for picking up an image is provided in each pixel in the pixel region 1. FIG. 2 is an equivalent circuit diagram showing an arrangement of a pixel and the sensor circuit 81 in the pixel region 1. In the example in FIG. 2, each pixel is formed by three colors of picture elements, namely R (red), G (green), and B (blue), and one sensor circuit 81 configured by a photodiode D1, a capacitor C2, and a thin film transistor M2 is provided in each of the pixels configured by these three picture elements. Specifically, with the configuration of the present embodiment, the pixel region 1 has pixels arranged in a matrix having L rows×M columns, and sensor circuits 81 arranged in a matrix having N rows×O columns. Note that in the present embodiment, the number of gate lines GL in the row direction (L) is equivalent to the number of sensor circuits 81 in the row direction (N), and the number of pixels in the column direction (M) is equivalent to the number of sensor circuits 81 in the column direction (O). The total number of picture elements in the pixel region 1 is equal to L×3M.

As shown in FIG. 2, the pixel region 1 has, as wiring for the pixels, the gate lines GL and source lines SL that are arranged in a matrix. The gate lines GL are connected to the gate driver 2. The source lines SL are connected to the source driver 3. Note that L of the gate lines GL are provided in the pixel region 1. Hereinafter, the gate lines GL are indicated as GL(l) when there is a need to distinguish between individual gate lines GL in the description. Here, l is a natural number from 1 to L. On the other hand, three of the source lines SL are provided in each pixel in order to supply image data to the three picture elements in each pixel as mentioned above. The source lines SL are indicated as SLr(m), SLg(m), and SLb(m) when there is a need to distinguish between individual source lines SL in the description. Here, m is a natural number from 1 to M.

Thin film transistors (TFTs) M1 are provided as switching elements for the pixels at intersections between the gate lines GL and the source lines SL. Note that in FIG. 2, the thin film transistors M1 provided in the red, green, and blue picture elements are noted as M1r, M1g, and M1b respectively. In each thin film transistor M1, the gate electrode is connected to one of the gate lines GL, the source electrode is connected to one of the source lines SL, and the drain electrode is connected to a pixel electrode that is not shown. Accordingly, as shown in FIG. 2, a liquid crystal capacitor CLC is formed between the drain electrode of each thin film transistor M1 and the common electrode (VCOM). Also, an auxiliary capacitor C1 is formed between each drain electrode and a TFTCOM.

In FIG. 2, the picture element driven by the thin film transistor M1r, which is connected to the intersection between one gate line GL and one source line SLr, is provided with a red color filter so as to correspond to that picture element, and red image data is supplied from the source driver 3 to that picture element via the source line SLr, and thus that picture element functions as a red picture element. Also, the picture element driven by the thin film transistor M1g, which is connected to the intersection between the gate line GL and the source line SLg, is provided with a green color filter so as to correspond to that picture element, and green image data is supplied from the source driver 3 to that picture element via the source line SLg, and thus that picture element functions as a green picture element. Furthermore, the picture element driven by the thin film transistor M1b, which is connected to the intersection between the gate line GL and the source line SLb, is provided with a blue color filter so as to correspond to that picture element, and blue image data is supplied from the source driver 3 to that picture element via the source line SLb, and thus that picture element functions as a blue picture element.

In the configuration in FIG. 2, a power supply line Vsup that supplies power to the sensor circuit 81 and output wiring SData for outputting sensor circuit output data are provided separately from the source lines SL. Specifically, the drain of the thin film transistor M2 of the sensor circuit 81 is connected to the power supply line Vsup, and the source thereof is connected to the output wiring SData.

Note that in the example in FIG. 2, the sensor circuits 81 are provided in the ratio of one per pixel (three picture elements) in the pixel region 1. However, the disposition ratio of the pixels and sensor circuits 81 is arbitrary and not limited to merely this example. For example, one sensor circuit 81 may be disposed per picture element, and a configuration is possible in which one sensor circuit 81 is disposed for a plurality of pixels. As another example, a configuration is possible in which the sensor circuits 81 are disposed in every other row.

Below is a description of the configuration and operation of the various types of drivers shown in FIG. 1.

Figure 3:
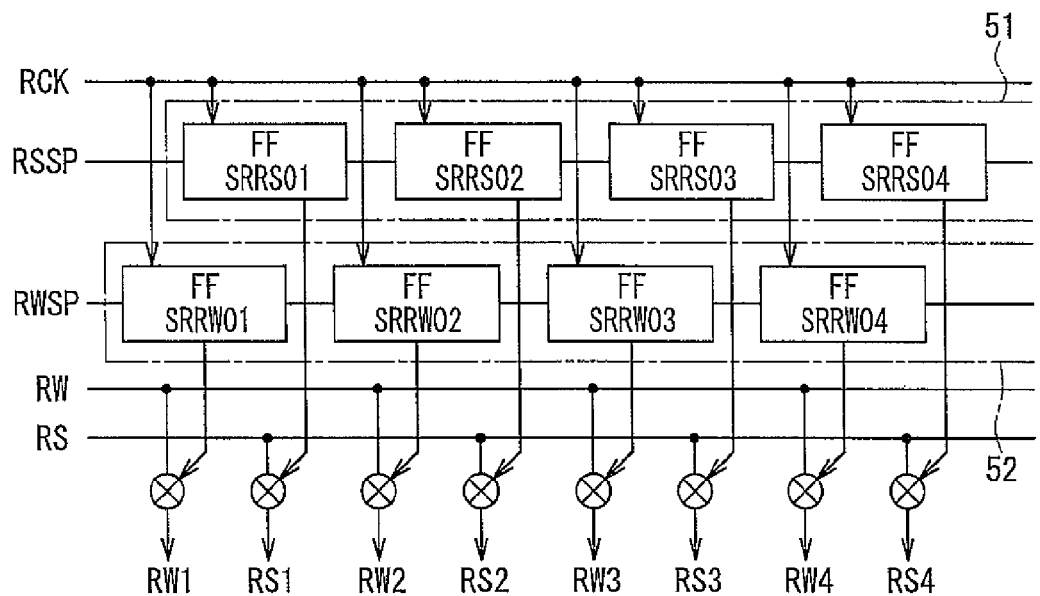
FIG. 3 is an equivalent circuit diagram showing an example of a configuration of a row driver.

First, a description will be given of a configuration of the row driver 5 and a method for driving the same with reference to FIGS. 3 and 4. As shown in FIG. 3, the row driver 5 has a shift register 51 composed of N flip-flops that, using RSSP as a start pulse signal, sequentially generate and transfer a signal in synchronization with a clock signal RCK, and a shift register 52 composed of N flip-flops that, using RWSP as a start pulse signal, sequentially generate and transfer a signal in synchronization with the clock signal RCK. With use of its output SRRSOn (n=1 to N), the shift register 51 controls the opening and closing of reset signal analog switches RSn (n=1 to N). With use of its output SRRWOn (n=1 to N), the shift register 52 controls the opening and closing of readout signal analog switches RWn (n=1 to N).

Figure 4:
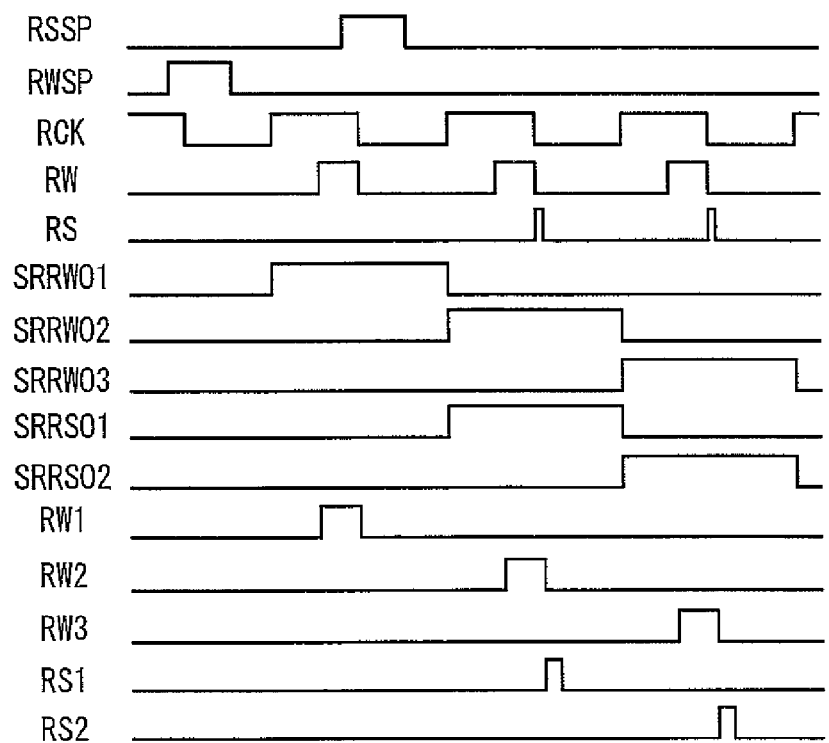
FIG. 4 is a timing chart showing the timing of signals related to the driving of the row driver.

In this way, the reset signal analog switches RSn and the readout signal analog switches RWn are controlled so as to be sequentially opened and closed, and therefore the reset signal RS and the readout signal RW are sequentially supplied to the rows of sensor circuits 81 disposed in the pixel region 1 (see FIG. 4). Note that in the configuration in FIG. 3, the shift register 51 for controlling the reset signal and the shift register 52 for controlling the readout signal are provided independently, thus enabling independently controlling the readout timing and the reset timing by changing the timing of the start pulses RSSP and RWSP respectively.

Figure 5:
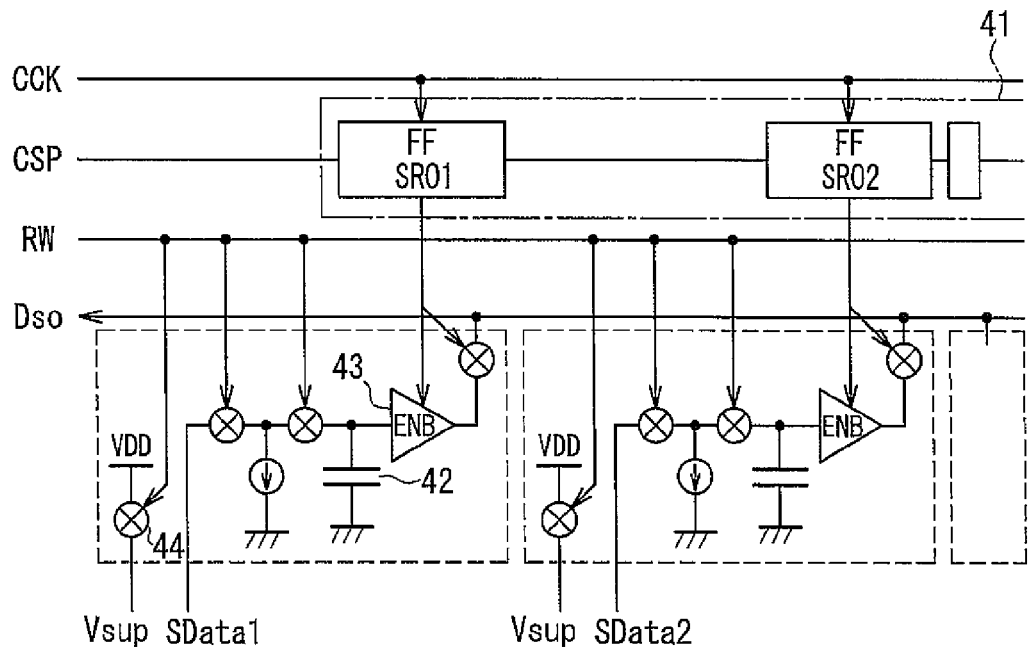
FIG. 5 is an equivalent circuit diagram showing an example of a configuration of a column driver.
Figure 6:
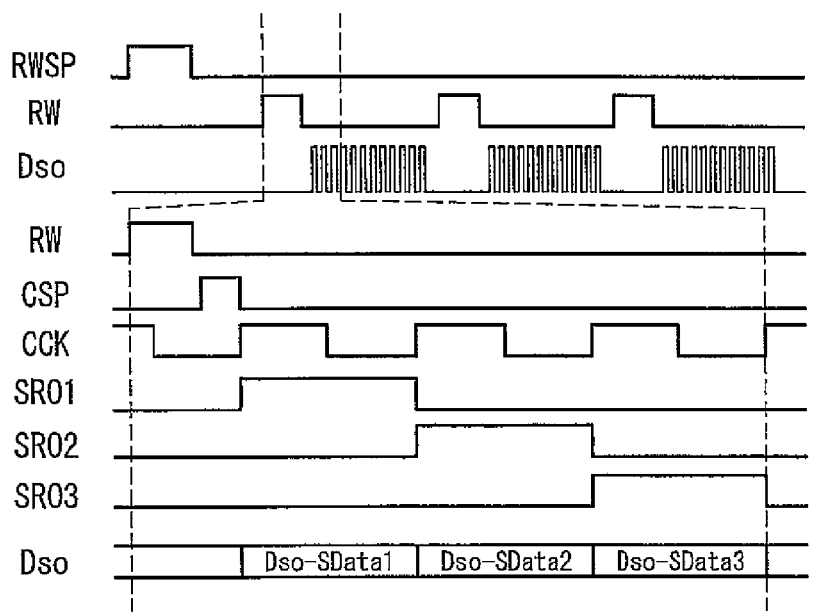
FIG. 6 is a timing chart showing the timing of signals related to the driving of the column driver.

Next is a description of a configuration and operation of the column driver 4 with reference to FIGS. 5 and 6.

As shown in FIG. 5, the column driver 4 has a shift register 41 composed of O flip-flops, holding capacitors 42, output circuits 43, and analog switches 44. With use of CSP as the start pulse, the shift register 41 sequentially generates and transfers a signal in synchronization with a clock signal CCK. The holding capacitors 42 sample sensor circuit output data SDatao (o=1 to O) in accordance with the readout signal RW, and hold the resultant data. The output circuits 43 are enabled by output SROo (o=1 to O) of the shift register 41, and output the data in the holding capacitors 42 to output lines Dso (see FIG. 1). The analog switches 44 are controlled by the readout signal RW, and one of the terminals of each of the analog switches 44 is connected to a power supply line Vsup.

As shown in FIG. 6, according to the configuration in FIG. 5, the sensor circuit output data SDatao for one row is collectively sampled by the holding capacitors 42 and held therein in accordance with the readout signal RW, and thereafter the held data is output to the output lines Dso at respective times in accordance with the sequentially shifted output SROo of the shift register 41. Also, in accordance with the readout signal RW, a constant voltage from power supplies VDD is supplied to the sensor circuits 81 via the power supply lines Vsup.

Figure 7:
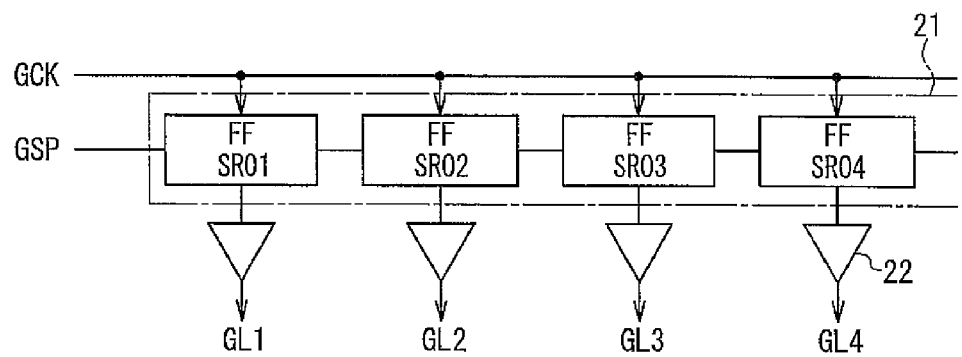
FIG. 7 is an equivalent circuit diagram showing an example of a configuration of a gate driver.
Figure 8:
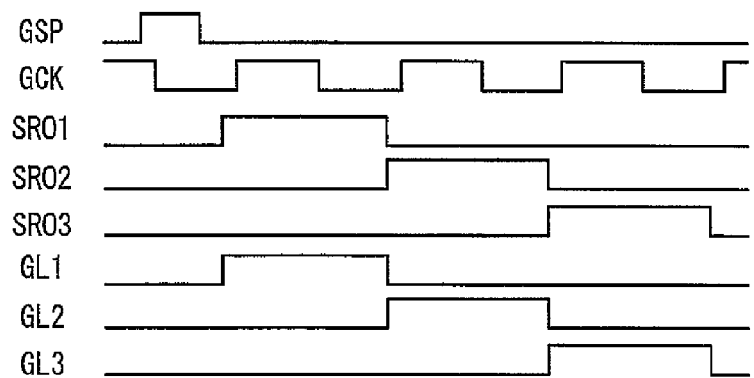
FIG. 8 is a timing chart showing the timing of signals related to the driving of the gate driver.

Next is a description of a configuration and operation of the gate driver 2 with reference to FIGS. 7 and 8. The gate driver 2 has a shift register 21 composed of L flip-flops, and output circuits 22. With use of GSP as the start pulse, the shift register 21 sequentially generates and transfers a signal in synchronization with a clock signal GCK. The output circuits 22 shape and amplify the output signals of output SROl (l=1 to L) of the shift register 21. The output of the output circuits 22 is sequentially output to the gate lines GLl (l=1 to L) in the pixel region 1 as row selection signals.

Figure 9:
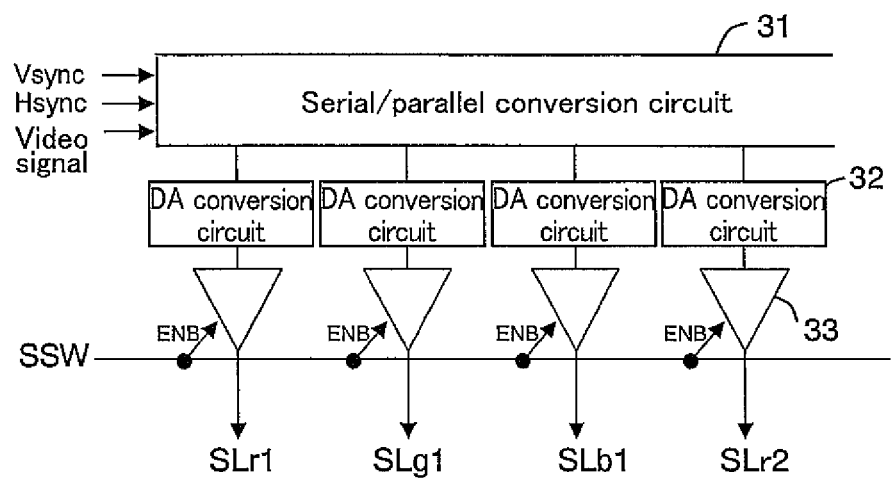
FIG. 9 is an equivalent circuit diagram showing an example of a configuration of a source driver.
Figure 10:
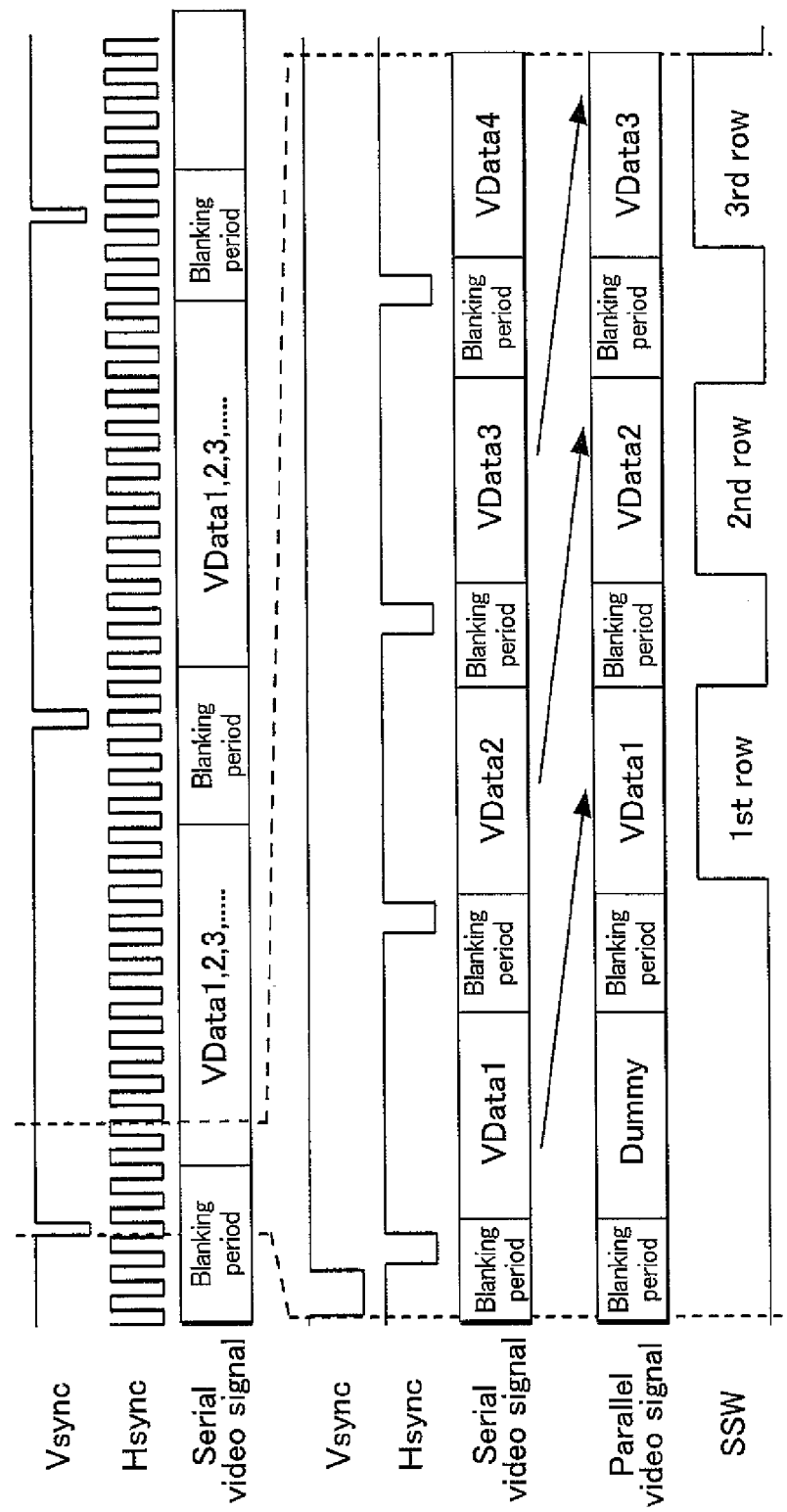
FIG. 10 is a timing chart showing the timing of signals related to the driving of the source driver.

Below is a description of a configuration and operation of the source driver 3 with reference to FIGS. 9 and 10. The source driver 3 has a serial/parallel conversion circuit 31, D/A conversion circuits 32, and amplifiers 33. In synchronization with synchronization signals (Vsync, Hsync, CK, and the like) that have been input from the outside, the serial/parallel conversion circuit 31 converts a serial video signal, which has been likewise input from the outside as digital data, into parallel data. The D/A conversion circuits 32 convert the digital video signal into an analog video signal. In synchronization with SSW, the amplifiers 33 amplify the output of the D/A conversion circuits 32 and output the result to the source lines SLm (m=1 to M).

Figure 11:
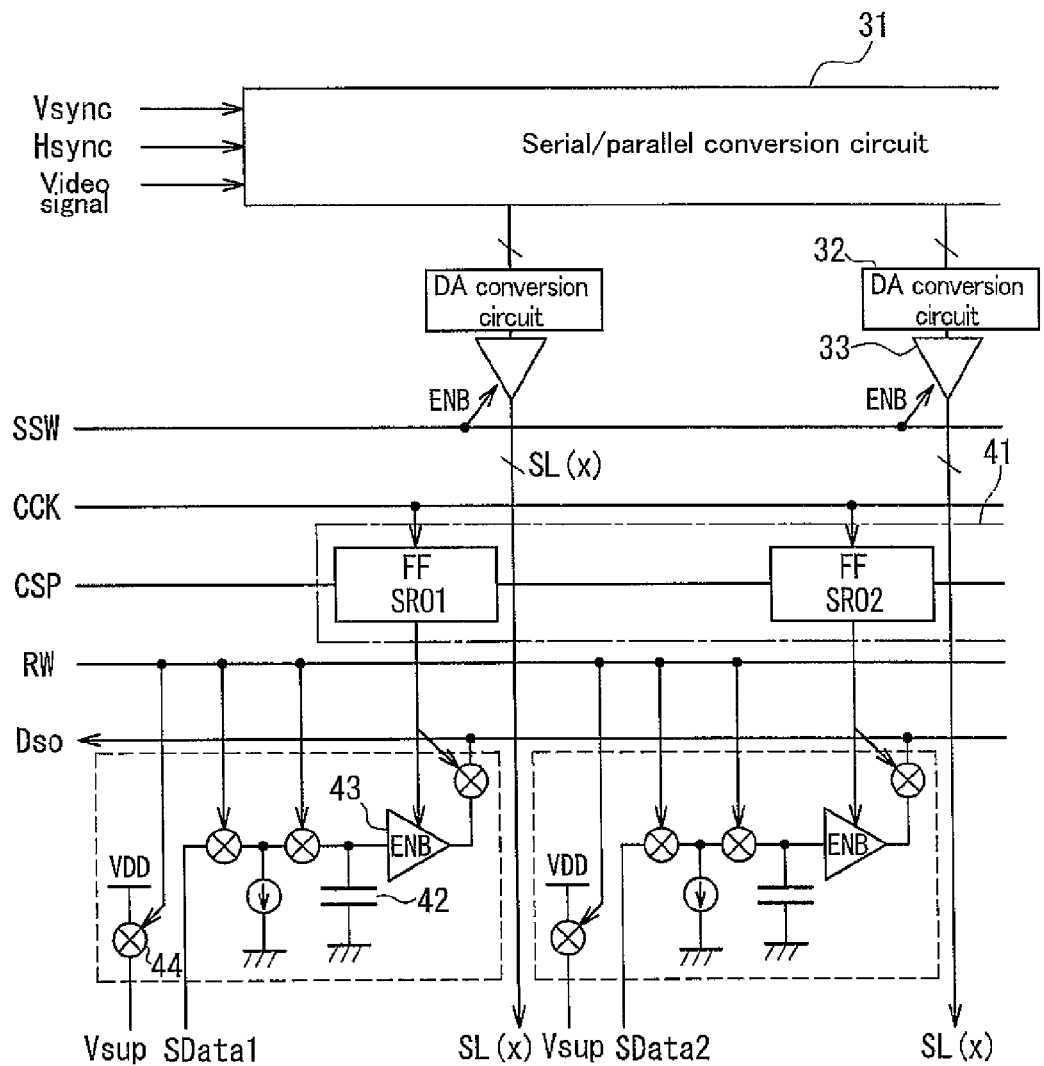
FIG. 11 is an equivalent circuit diagram showing an example of a configuration of a source driver and a column driver.

Also, FIG. 11 shows an example of the arrangement of the source driver 3 and the column driver 4. The configuration shown in FIG. 11 is basically a combination of the configuration of the column driver 4 shown in FIG. 5 and the configuration of the source driver 3 shown in FIG. 9. The number of source lines SL between the flip-flops that configure the shift register 41 of the column driver 4 and are connected by cascade connection depends on the arrangement of the sensor circuits 81 in the column direction (horizontal direction). In the case of the present embodiment, as shown in FIG. 2, one sensor circuit 81 is provided per three picture elements (one pixel), and therefore in FIG. 11, the three sources lines SLr, SLg, and SLb are provided between the flip-flops that configure the shift register 41 of the column driver 4 and are connected by cascade connection.

Figure 12:
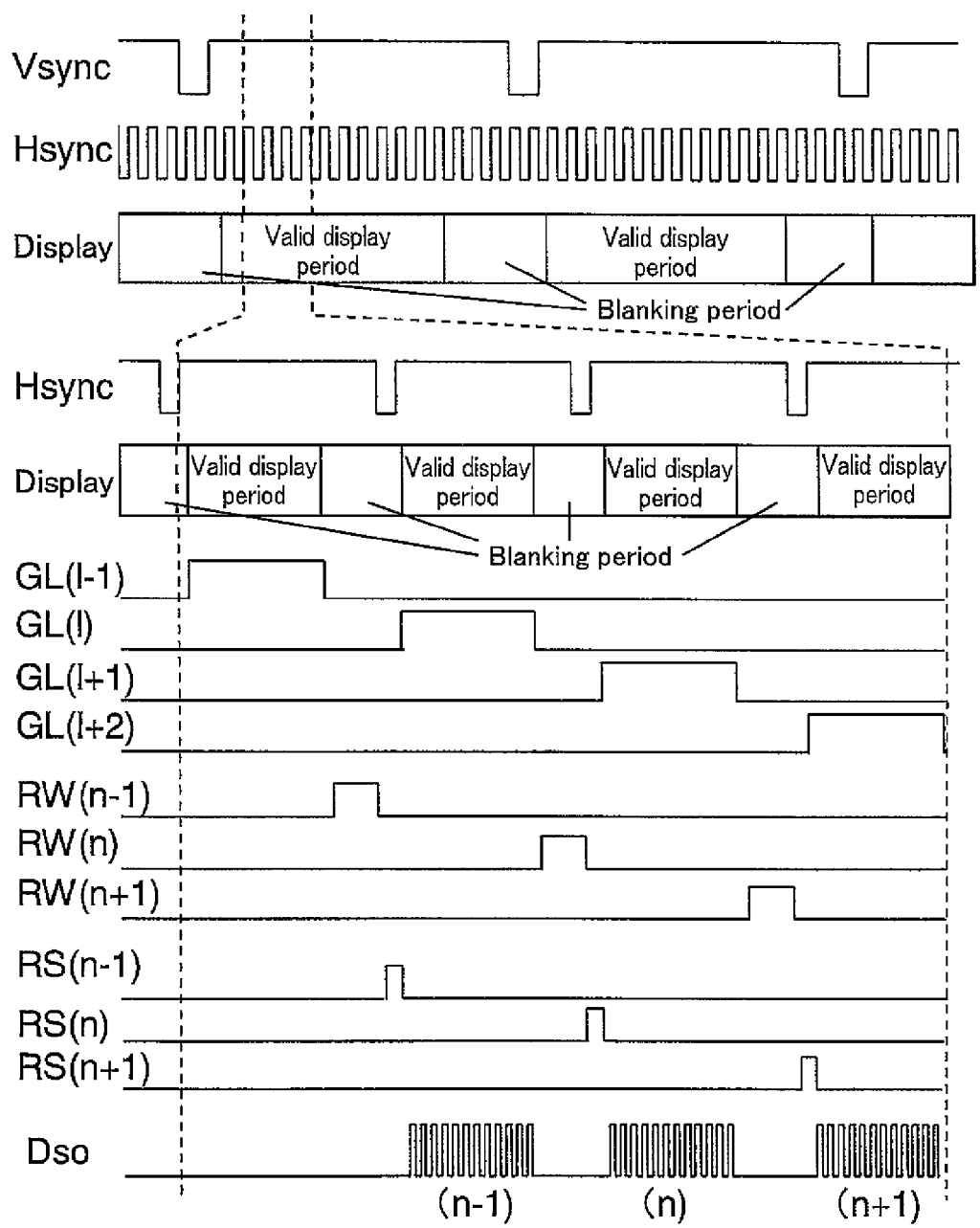
FIG. 12 is a timing chart showing the relationship between display operation timing and sensing timing.

Next is a description of the timing of display operation of the pixels in the pixel region 1 and the timing of operation of the photosensors with reference to FIG. 12. In the example shown in FIG. 12, the readout signal RW is turned on in the blanking period of the horizontal scan period, and the sensor circuit output data SData is read out to the output line Dso. Note that since in the display device of the present embodiment, the power supply lines Vsup and the output wiring SData for outputting sensor circuit output data are provided separately from the source lines SL as shown in FIG. 2, the readout signal RW may be applied in the active display period. It should also be noted that FIG. 12 shows driving timing in the case where the readout signal RW and the reset signal RS are applied in accordance with a constant timing in each vertical period; the reset signal RS(n) is applied to the sensor circuits 81 in the n-th row in a certain vertical period, and sensor circuit output data from these sensor circuits 81 is read out due to the readout signal RW(n) applied in the next vertical period. In other words, in the example in FIG. 12, the sensing period of the sensor circuits 81 has a length substantially close to that of one vertical period.

Figure 13:
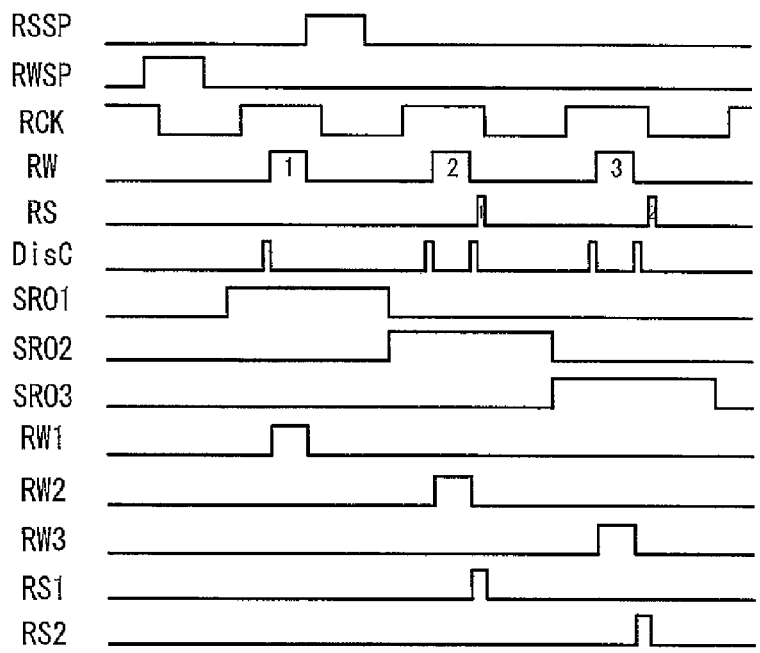
FIG. 13 is a timing chart showing the timing of sensor driving signals according to Embodiment 1.

Note that a feature of the display device according to the present embodiment is that the output wiring SData is fixed at a predetermined potential V0 immediately before the readout signal RW and the reset signal RS. For this reason, as shown in FIG. 13, a discharge signal DisC that is turned on immediately before the readout signal RW and the reset signal RS is used as a control signal for applying the constant potential V0 to the output wiring SData. Note that the potential V0 is arbitrary as long as it is a constant potential, and the potential V0 may be, for example, the ground potential.

Figure 14:
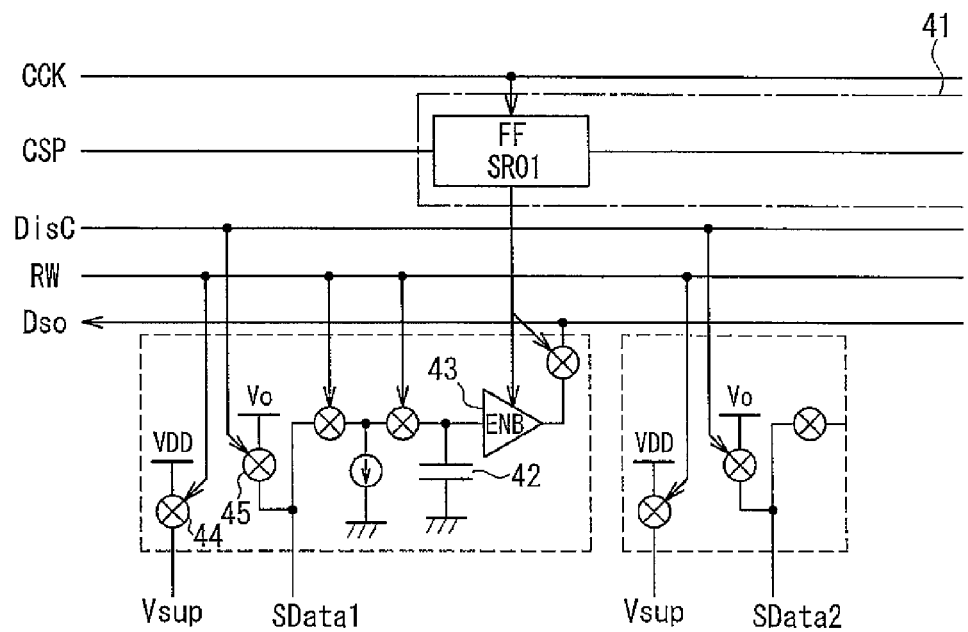
FIG. 14 is an equivalent circuit diagram showing a configuration of a column driver according to Embodiment 1.

FIG. 14 shows an example of a circuit configuration for applying the above-described discharge signal DisC to the output wiring SData. As shown in FIG. 14, a feature of the column driver 4 according to the present embodiment is that an analog switch 45 whose opening and closing is controlled by the discharge signal DisC has been added to the basic configuration shown in FIGS. 5 and 11. One end of the analog switch 45 is connected to the constant voltage source V0, and the other end thereof is connected to the output wiring SData.

Figure 15:
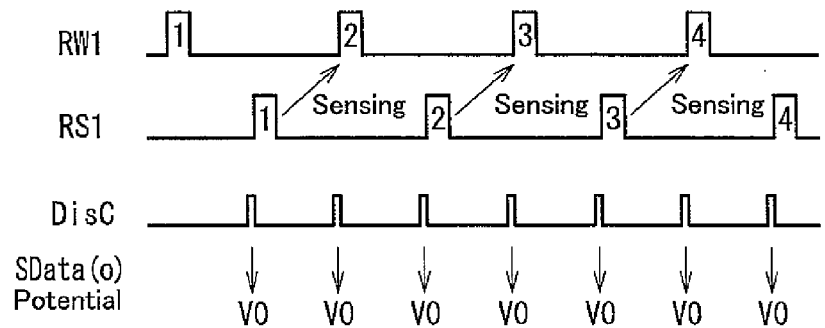
FIG. 15 is a timing chart showing the relationship between a readout signal, a reset signal, a discharge signal, and the potential of data output wiring.
Figure 30:
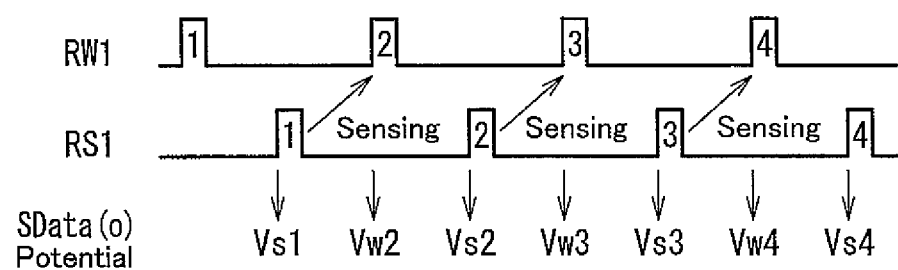
FIG. 30 is a timing chart for describing a situation in which the potential of data readout wiring fluctuates immediately before a readout signal and immediately before a reset signal.

According to this configuration, as shown in FIG. 15, the potential of the output wiring SData is fixed at the constant potential V0 when the discharge signal DisC is on, that is to say, immediately before the readout signal RW and the reset signal RS. Accordingly, as can be seen by a comparison of FIG. 15 and FIG. 30 that was referenced in the background art section, the configuration of the present embodiment enables eliminating the influence that the fluctuation in the potential of the output wiring SData exerts on the storage node via a parasitic capacitance. This enables obtaining highly precise sensor circuit output from which offset has been removed.

Variation 1 of Embodiment 1

Figure 16:
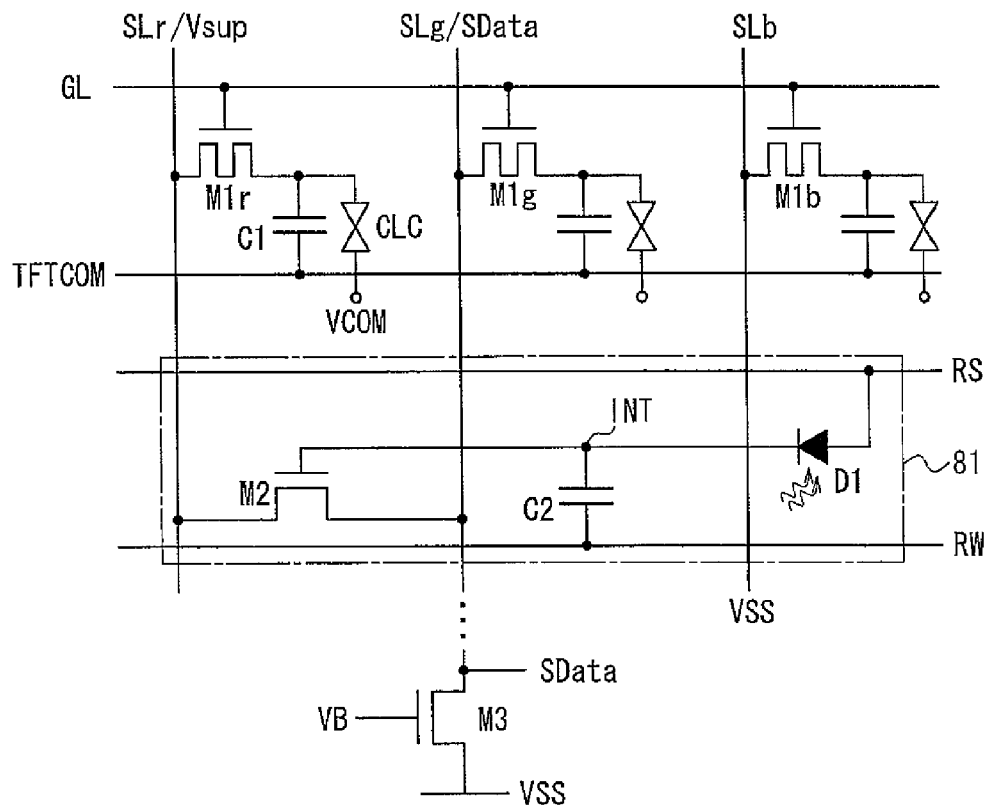
FIG. 16 is an equivalent circuit diagram showing a configuration of a pixel in a display device according to an embodiment of the present invention.

Note that in the above description of the present embodiment, an example of a configuration is shown in which the power supply lines Vsup and the output wiring SData for sensor circuit output data are provided separately from the source lines SL as shown in FIG. 2. However, a circuit configuration may be adopted in which, as shown in FIG. 16, the source lines SL also serve as the power supply lines Vsup and the output wiring SData for sensor circuit output data. Even in the case of this configuration, and furthermore the case of performing driving in accordance with the timing shown in FIG. 12, fixing the potential of the output wiring SData at the constant potential V0 immediately before the readout signal RW and the reset signal RS enables eliminating offset originating from a parasitic capacitance and obtaining highly precise sensor circuit output.

Specifically, in the circuit configuration shown in FIG. 16, in the case where the sensor circuits 81 are driven in accordance with the timing shown in FIG. 12, the potential of the output wiring SData immediately before the readout signal RW is applied (Vw1, Vw2, . . . shown in FIG. 30) is dependent on the immediately previous display data. Also, the potential of the output wiring SData immediately before the reset signal RS is applied (Vs1, Vs2, . . . shown in FIG. 30) is dependent on the immediately previous sensor circuit output data.

Accordingly, in this case as well, even if the amount of light that is incident on the photodiode D1 is constant, the sensor circuit output data has an offset originating from the fluctuation in the potential of the output wiring SData immediately before the readout signal RW and the reset signal RS. Also, as mentioned above, the offset is not constant, and therefore cannot be simply eliminated. However, in this case as well, fixing the potential of the output wiring SData to the constant potential V0 in synchronization with the discharge signal DisC that turns on immediately before the readout signal RW and the reset signal RS as described above enables eliminating offset originating from a parasitic capacitance and obtaining highly precise sensor circuit output.

Variation 2 of Embodiment 1

Also, in the above description of the present embodiment, the sensor circuit 81 is provided in each pixel in the row direction (vertical direction), and driving is performed in accordance with timing such as that shown in FIG. 12. However, in the case where the sensor circuit 81 is provided in every other pixel in the row direction, the sensor circuits 81 are driven in accordance with the timing shown in FIG. 17. Specifically, the readout signal RW and the reset signal RS are applied to the sensor circuits 81 in every other horizontal period.

Figure 17:
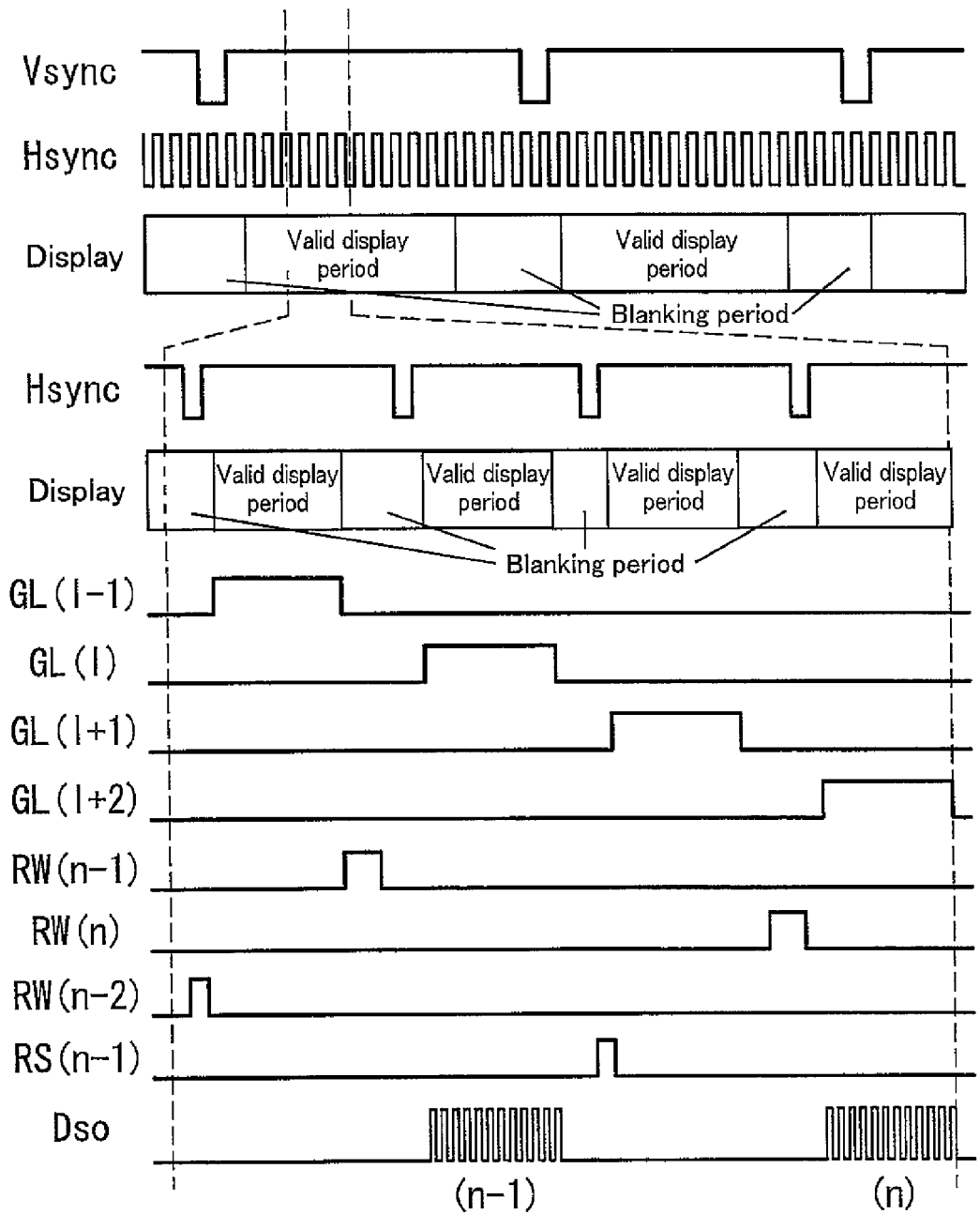
FIG. 17 is a timing chart showing the relationship between display operation timing and sensing timing.

Here, if the driving timing in FIG. 17 is applied to a circuit configuration in which the source lines SL also serve as the power supply lines Vsup and the output wiring SData for sensor circuit output data as shown in FIG. 16, the potential of the output wiring SData immediately before the readout signal RW is applied (Vw1, Vw2, . . . shown in FIG. 30) is dependent on the immediately previous display data. Also, the potential of the output wiring SData immediately before the reset signal RS is applied (Vs1, Vs2, . . . shown in FIG. 30) is also dependent on the immediately previous display data.

Accordingly, in this case as well, even if the amount of light that is incident on the photodiode D1 is constant, the sensor circuit output data has an offset originating from the fluctuation in the potential of the output wiring SData immediately before the readout signal RW and the reset signal RS. Also, as mentioned above, the offset is not constant, and therefore cannot be simply eliminated. However, in this case as well, fixing the potential of the output wiring SData to the constant potential V0 in synchronization with the discharge signal DisC that turns on immediately before the readout signal RW and the reset signal RS as described above enables eliminating offset originating from a parasitic capacitance between the storage node and the output wiring SData and obtaining highly precise sensor circuit output.

Embodiment 2

Below is a description of Embodiment 2 of the present invention. Note that constituent elements having the same functions as constituent elements described in Embodiment 1 have been given the same reference numerals as those in Embodiment 1, and detailed descriptions thereof have been omitted.

A display device according to Embodiment 2 has the circuit configuration shown in FIG. 16, the sensor circuits 81 are provided in every other pixel in the row direction, and the sensor circuits 81 are driven in accordance with the timing shown in FIG. 17. Also, although the potential of the output wiring SData is fixed to the constant potential V0 immediately before the readout signal RW and the reset signal RS likewise to Embodiment 1, Embodiment 2 differs from Embodiment 1 in that the power supply voltage (VDD) that has conventionally been supplied to the sensor circuits 81 via the power supply lines Vsup only at the time of application of the readout signal RW is also supplied immediately before the reset signal RS as shown in FIG. 18.

Figure 18:
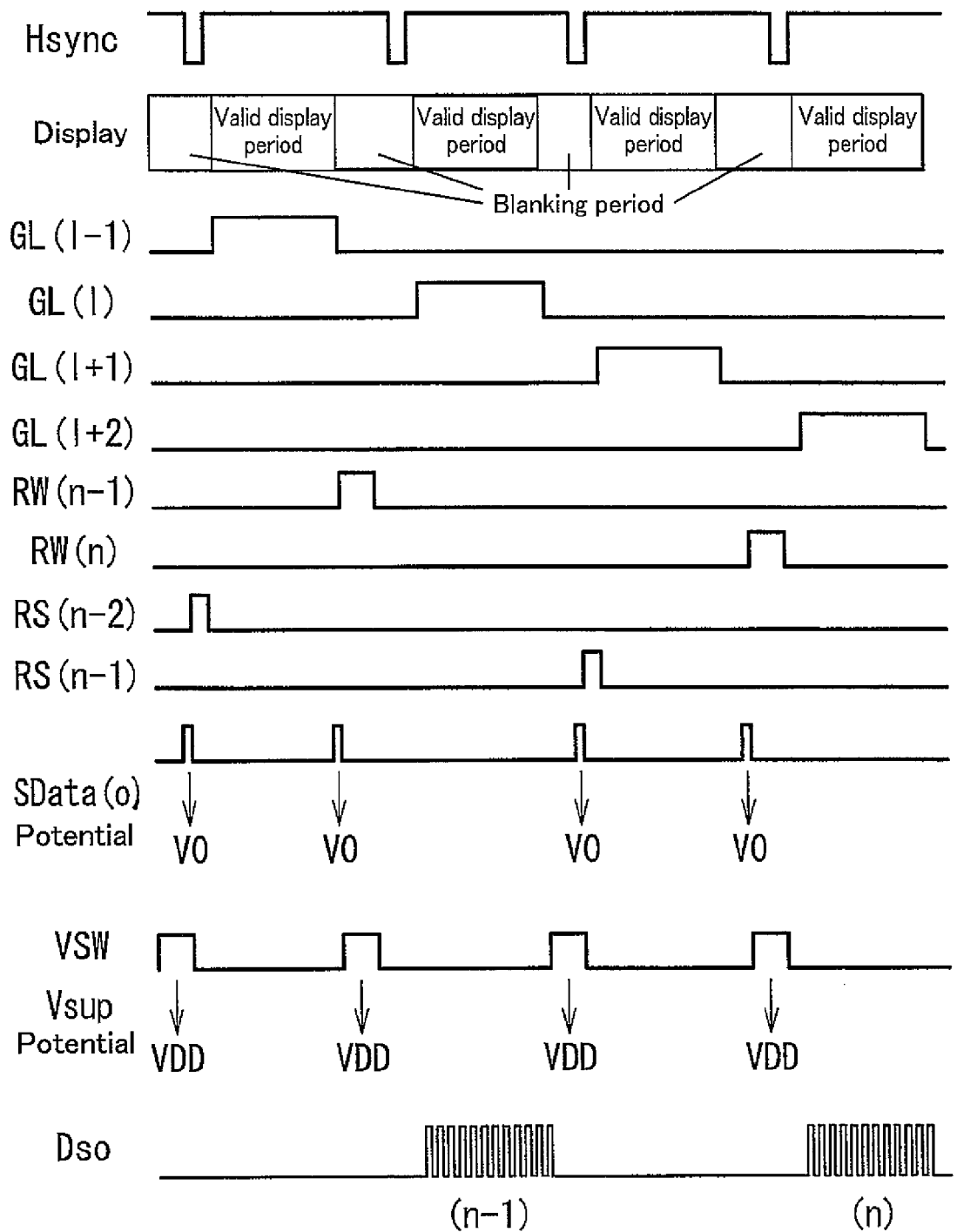
FIG. 18 is a timing chart showing the timing of sensor driving signals according to Embodiment 2.
Figure 19:
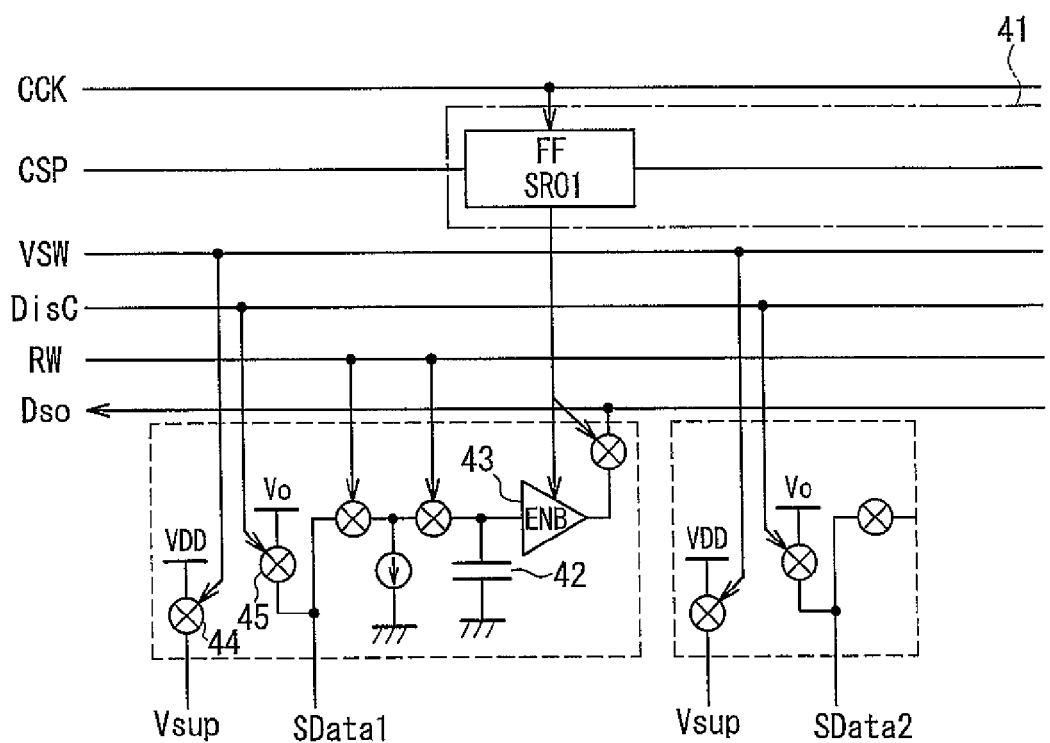
FIG. 19 is an equivalent circuit diagram showing a configuration of a column driver according to Embodiment 2.

Specifically, in Embodiment 2, the power supply voltage (VDD) is supplied to the power supply lines Vsup while a signal VSW is on, the signal VSW being turned on in a predetermined period immediately before the reset signal RS and while the readout signal RW is on, as shown in FIG. 18. In order to realize this, in the display device according to Embodiment 2, the analog switches 44 that control the supply of the power supply voltage (VDD) to the power supply lines Vsup in the column driver 4 are opened and closed in accordance with the signal VSW as shown in FIG. 19. Note that in Embodiment 1, the opening and closing of the analog switches 44 for the power supply lines Vsup is controlled in accordance with the readout signal RW as shown in FIGS. 5, 11, and 14.

In this way, the potential of the power supply lines Vsup is fixed to a predetermined potential (the power supply voltage VDD) immediately before the reset signal RS in accordance with the signal VSW, which is independent from the readout signal RW, thus enabling the potential of the power supply lines Vsup immediately before the readout signal RW and the reset signal RS to be kept constant regardless of their previous state, as shown in FIG. 18. This enables eliminating offset originating from a parasitic capacitance between the storage node and the power supply lines Vsup and obtaining highly precise sensor circuit output. Also, similarly to Embodiment 1, fixing the potential of the output wiring SData to the constant potential V0 immediately before the readout signal RW and the reset signal RS enables eliminating offset originating from a parasitic capacitance between the storage node and the output wiring SData and obtaining highly precise sensor circuit output.

Note that in the above description of Embodiment 2, an example has been described in which the display device has the circuit configuration shown in FIG. 16, the sensor circuits 81 are provided in every other pixel in the row direction, and the sensor circuits 81 are driven in accordance with the timing shown in FIG. 17. However, the control of the power supply lines Vsup in accordance with the signal VSW can be applied to the circuit configuration shown in FIG. 2 as well, and similar effects are obtained. Also, even in the case of driving the sensor circuits 81 in accordance with the timing shown in FIG. 12 in a configuration in which the sensor circuits 81 are provided in each pixel in the row direction, the control of the power supply lines Vsup in accordance with the signal VSW can be applied, and similar effects are obtained.

Embodiment 3

Below is a description of Embodiment 3 of the present invention. Note that constituent elements having the same functions as constituent elements described in the above-described embodiments have been given the same reference numerals as those in the above-described embodiments, and detailed descriptions thereof have been omitted.

Figure 20:
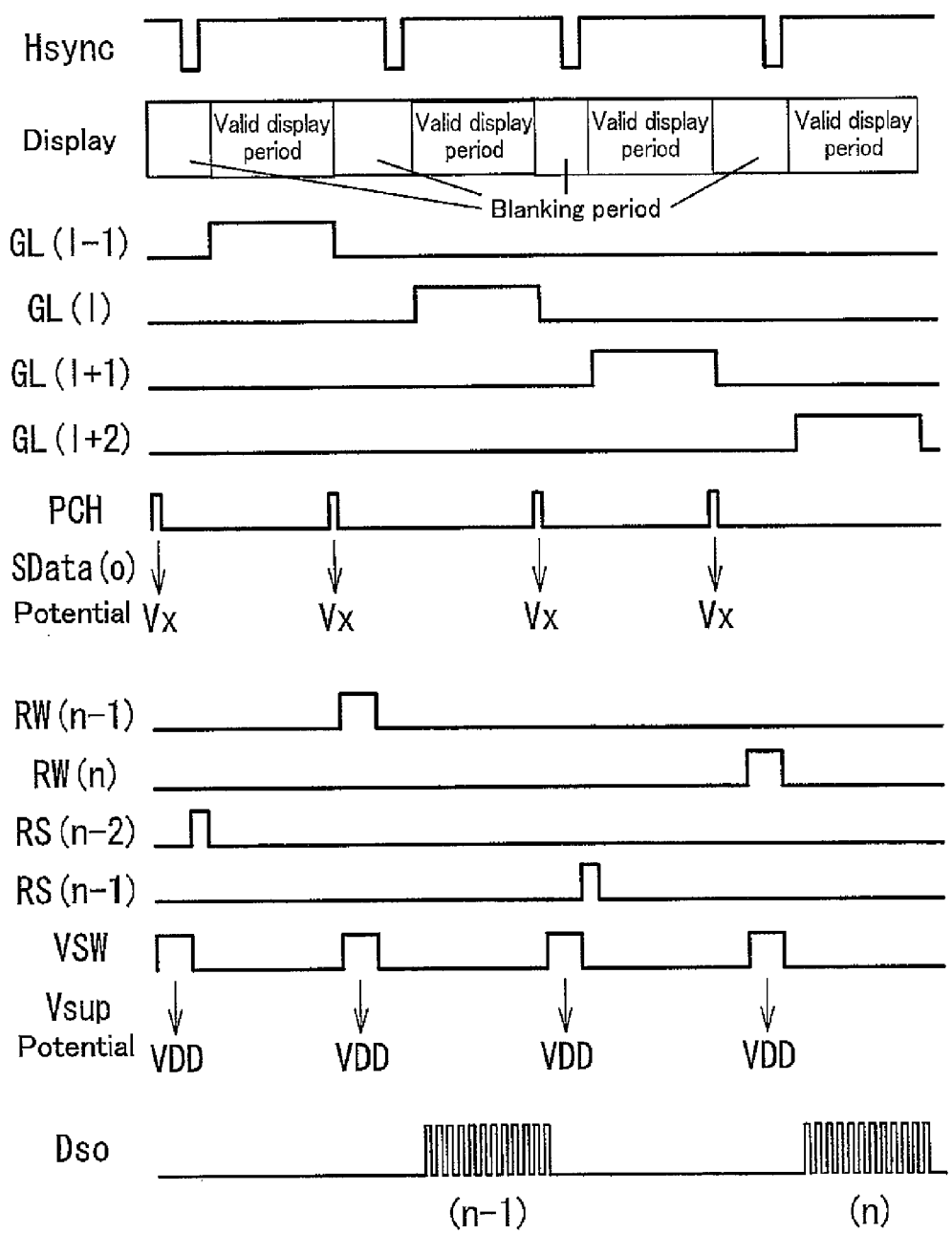
FIG. 20 is a timing chart showing the timing of sensor driving signals according to Embodiment 3.

A display device according to Embodiment 3 has the circuit configuration shown in FIG. 16, the sensor circuits 81 are provided in each pixel in the row direction, and the sensor circuits 81 are driven in accordance with the timing shown in FIG. 12. Also, the potential of the output wiring SData is fixed to a predetermined potential immediately before the readout signal RW and the reset signal RS likewise to Embodiment 1. However, Embodiment 3 differs from Embodiment 1 in that the predetermined potential is a predetermined level (Vx) input as a video signal as shown in FIG. 20. Note that there are two types of methods for obtaining this constant potential Vx, the first of which uses the output of a voltage follower constituting the output amplification circuit 33 (see FIG. 9 and the like) of the source driver 3, and the second of which uses the signal line potential fixing function of the output amplification circuit 33 of the source driver 3.

Figure 21:
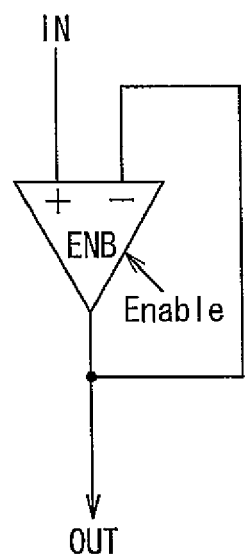
FIG. 21 is an equivalent circuit diagram showing a configuration of a differential amplification circuit of a source driver according to Embodiment 3.

Firstly, in the case of the above-described first method, the output amplification circuit 33 that amplifies output to the source lines SL that function as the wiring SData is realized by a voltage follower circuit obtained by applying negative feedback to a differential amplification circuit, as shown in FIG. 21. This circuit amplifies the current of an input voltage IN when in an active state due to Enable output. On the other hand, this circuit is in a high impedance state when inactive.

Accordingly, it is sufficient to turn on an enable signal also in accordance with the timing of a signal PCH shown in FIG. 20, and input, as the input voltage IN, a voltage that obtains the predetermined voltage Vx after amplification.

Figure 22A:
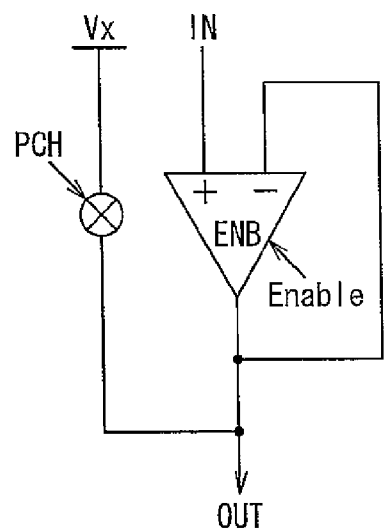
FIG. 22A is an equivalent circuit diagram showing a configuration of a differential amplification circuit of the source driver according to Embodiment 3.
Figure 22B:
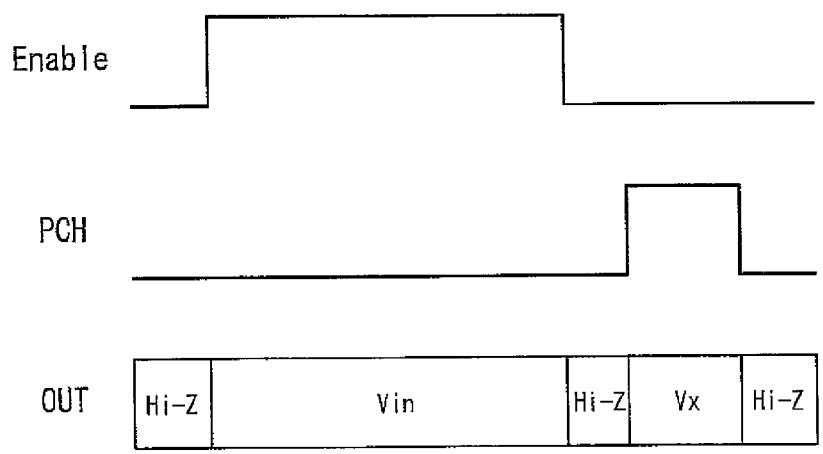
FIG. 22B is a timing chart showing the timing of driving signals of the circuit in FIG. 22A.

On the other hand, in the case of the above-described second method, it is sufficient for the output amplification circuit 33 that amplifies output to the source lines SL that function as the wiring SData to employ a configuration in which the differential amplification circuit shown in FIG. 21 is furthermore provided with a switch as shown in FIG. 22A. According to the configuration in FIG. 22A, the constant voltage Vx can be output to the source lines SL that serve as the wiring SData only while the signal PCH is on, as shown in FIG. 22B.

According to Embodiment 3 as described above, fixing the potential of the output wiring SData to the constant potential Vx immediately before the readout signal RW and the reset signal RS enables eliminating offset originating from a parasitic capacitance between the storage node and the output wiring SData and obtaining highly precise sensor circuit output.

Also, similarly to Embodiment 2, the potential of the power supply lines Vsup is fixed to a predetermined potential (the power supply voltage VDD) immediately before the reset signal RS in accordance with the signal VSW, which is independent from the readout signal RW, thus enabling the potential of the power supply lines Vsup immediately before the readout signal RW and the reset signal RS to be kept constant regardless of their previous state, as shown in FIG. 18. This enables eliminating offset originating from a parasitic capacitance between the storage node and the power supply lines Vsup and obtaining highly precise sensor circuit output.

Note that in the above description of Embodiment 3, an example has been described in which the display device has the circuit configuration shown in FIG. 16, the sensor circuits 81 are provided in every other pixel in the row direction, and the sensor circuits 81 are driven in accordance with the timing shown in FIG. 17. However, even in the case of driving the sensor circuits 81 in accordance with the timing shown in FIG. 12 in a configuration in which the sensor circuits 81 are provided in each pixel in the row direction, similar effects are obtained by fixing the potential of the output wiring SData to the predetermined potential Vx immediately before the readout signal RW and the reset signal RS as described above.

Embodiment 4

Below is a description of Embodiment 4 of the present invention. Note that constituent elements having the same functions as constituent elements described in the above-described embodiments have been given the same reference numerals as those in the above-described embodiments, and detailed descriptions thereof have been omitted.

Figure 23:
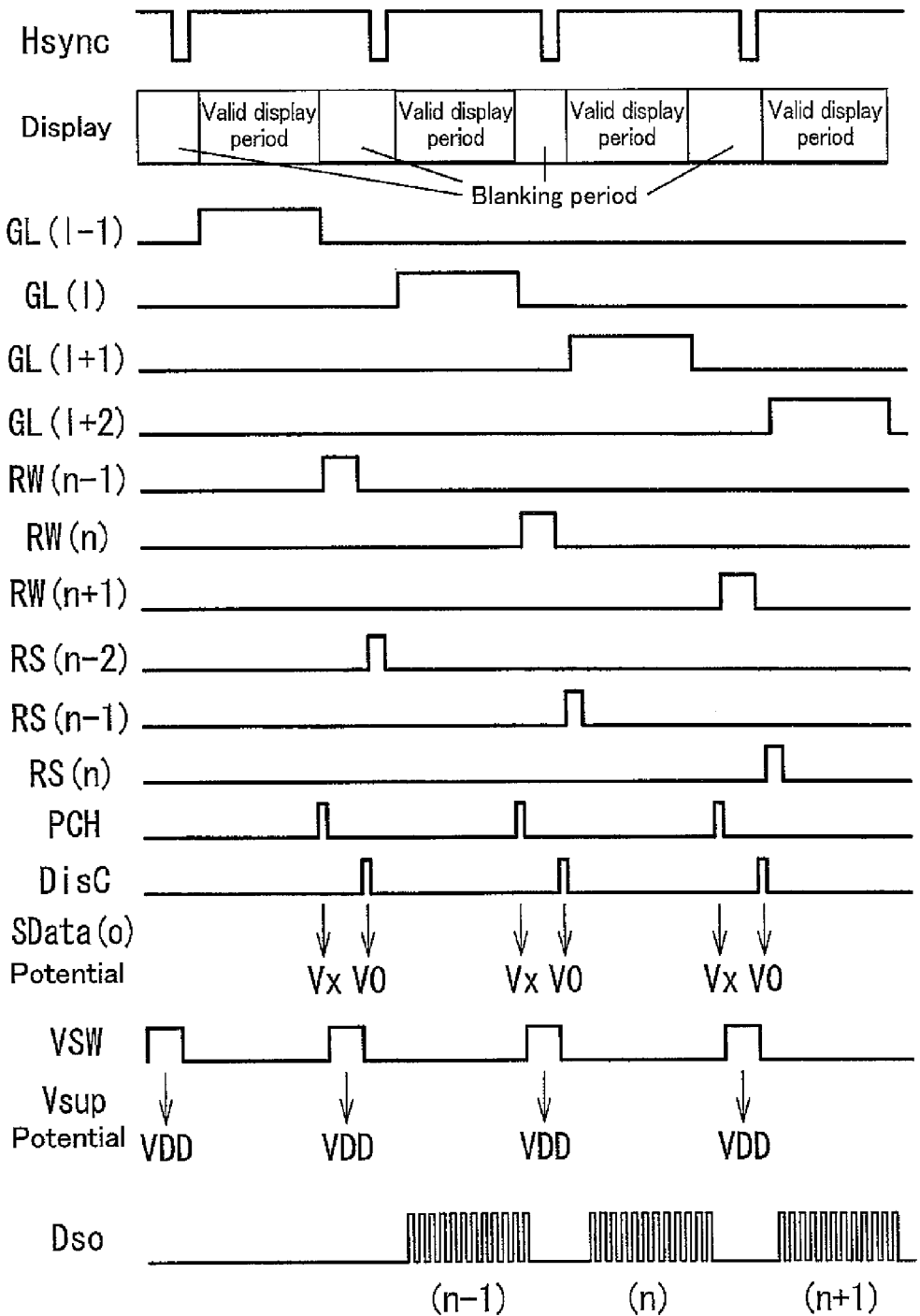
FIG. 23 is a timing chart showing the timing of sensor driving signals according to Embodiment 4.

A display device according to Embodiment 4 has the circuit configuration shown in FIG. 16, the sensor circuits 81 are provided in each pixel in the row direction, and the sensor circuits 81 are driven in accordance with the timing shown in FIG. 12. Also, in the display device according to Embodiment 4, as shown in FIG. 23, the predetermined level (Vx) input as a video signal immediately before the readout signal RW is supplied to the source lines SL that function as the wiring SData (see Embodiment 3). Also, the predetermined voltage V0 is supplied to the source lines SL that function as the wiring SData immediately before the reset signal RS (see Embodiment 1). Furthermore, both immediately before the reset signal RS and in the period in which the readout signal RW is applied, the potential of the power supply lines Vsup is fixed to a predetermined potential (power supply voltage VDD) in accordance with the signal VSW that is independent from the readout signal RW (see Embodiment 2). Note that the voltages V0 and Vx are arbitrary, on the condition that they are both constant values. Also, the values of V0 and Vx may be mutually different.

As described above, combining Embodiments 1 to 3 enables eliminating both offset originating from a parasitic capacitance between the storage node and the output wiring SData and offset originating from a parasitic capacitance between the storage node and the power supply lines Vsup, and obtaining highly precise sensor circuit output.

Although several embodiments of the present invention have been described above, the present invention is not limited to only the above-described embodiments, and various modifications can be made within the scope of the invention.

For example, in the present invention, it is preferable that the potential of the wiring having a parasitic capacitance with the storage node is fixed to the predetermined potential both immediately before the readout signal RW and immediately before the reset signal RS. However, there are cases where a sufficient effect is obtained even by fixing the potential of the wiring having a parasitic capacitance with the storage node to the predetermined potential only either immediately before the readout signal RW or immediately before the reset signal RS. Accordingly, for example, the application of the voltage V0 in accordance with the discharge signal DisC may be omitted in Embodiment 4.

Figure 24:
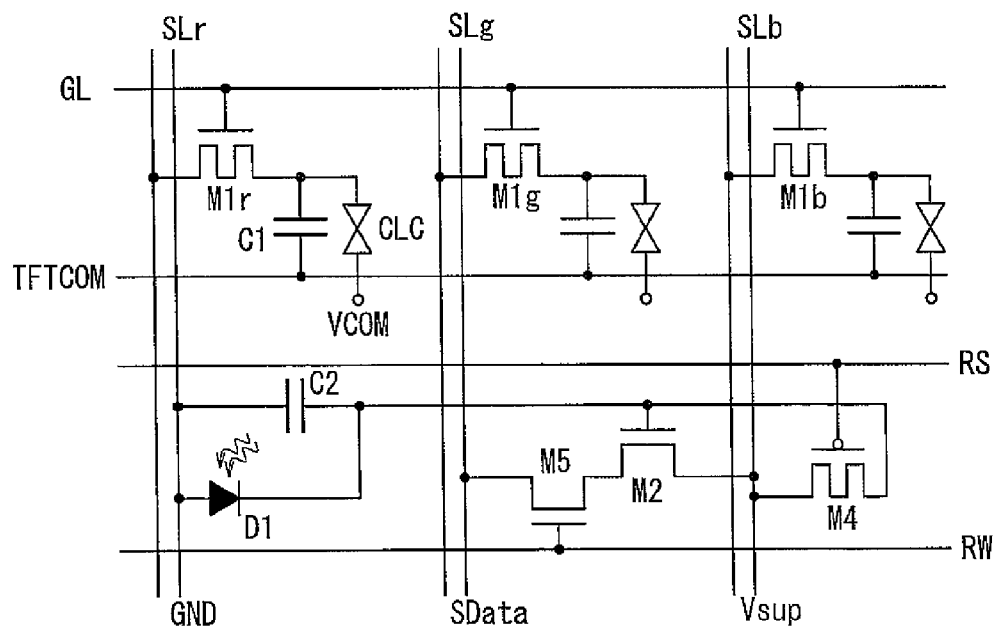
FIG. 24 is an equivalent circuit diagram showing another embodiment of a sensor circuit to which the present invention is applicable.
Figure 25:
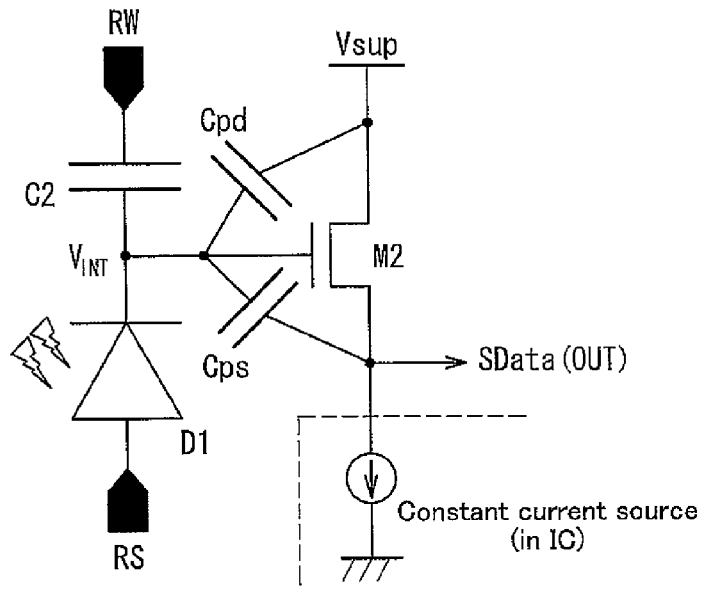
FIG. 25 is an equivalent circuit diagram showing an example of a conventional photosensor formed on an active matrix substrate.
Figure 26:
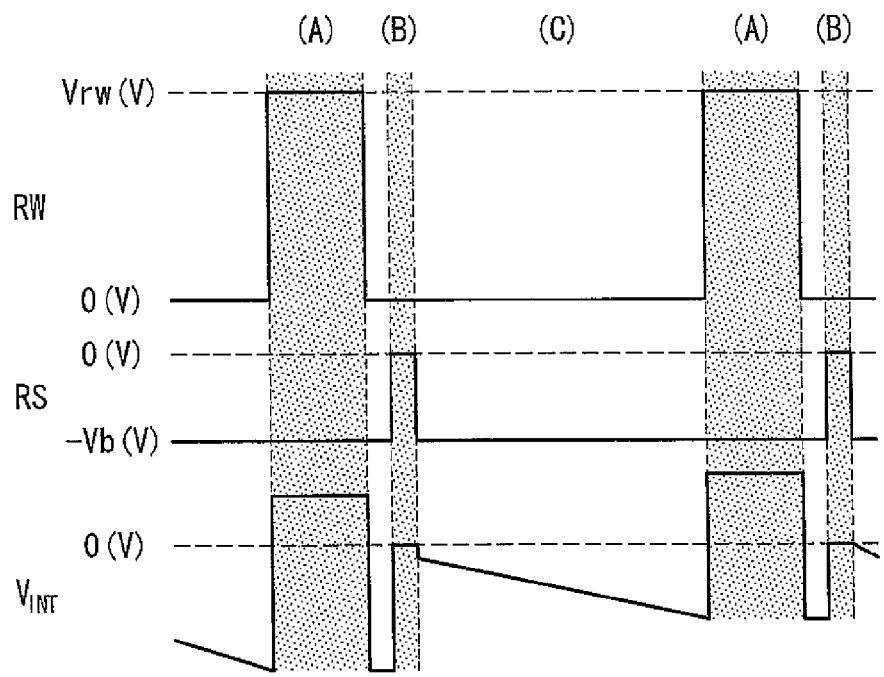
FIG. 26 is a timing chart showing waveforms of driving signals in the conventional photosensor.
Figure 27:
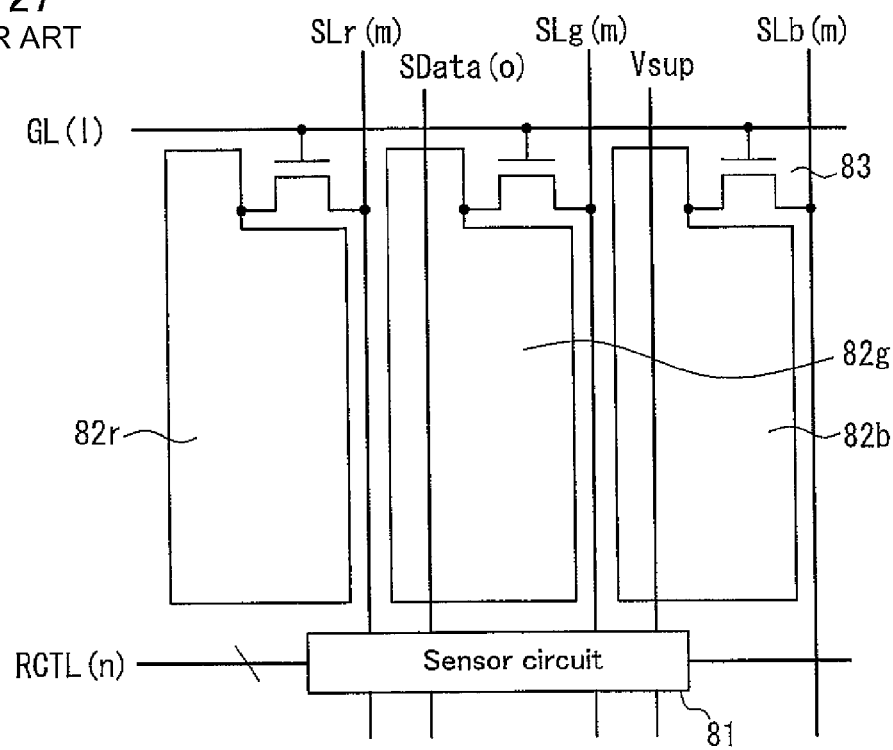
FIG. 27 is an illustrative diagram showing an example of wiring in the conventional photosensor.
Figure 28:
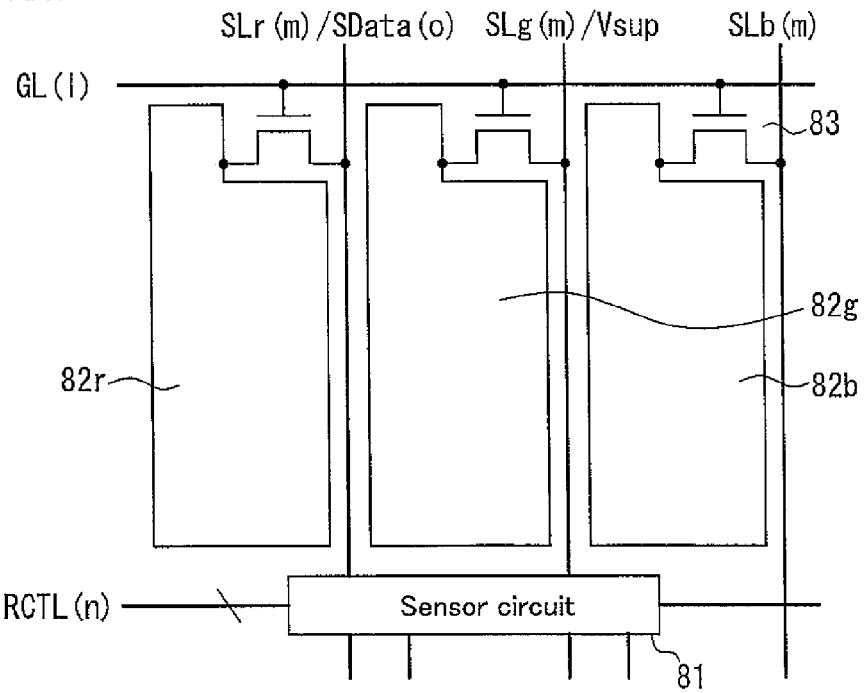
FIG. 28 is an illustrative diagram showing another example of wiring in the conventional photosensor.
Figure 29:
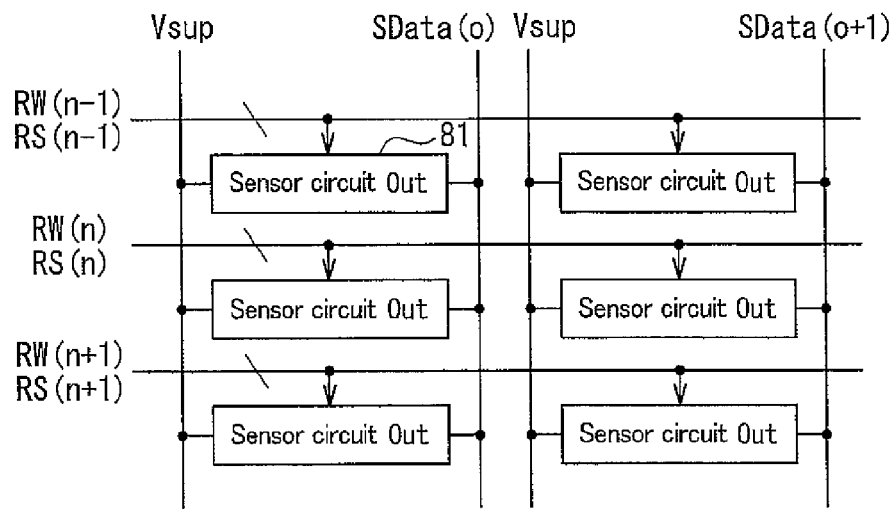
FIG. 29 is an equivalent circuit diagram showing the connection relationship between the photosensor circuit and peripheral wiring.

Furthermore, in the above-described embodiments, an example has been given of a configuration in which the sensor circuit 81 has a photodiode D1, a capacitor C2, and one thin film transistor M2 as shown in FIGS. 2 and 16. However, the present invention is also applicable to a configuration in which, as shown in FIG. 24, the sensor circuit 81 includes a photodiode D1, a capacitor C2, and three thin film transistors M2, M4, and M5. Specifically, in such a configuration, fixing the potential of the wiring having a parasitic capacitance with the storage node to the predetermined potential only either immediately before the readout signal RW or immediately before the reset signal RS enables eliminating offsets originating from a parasitic capacitance between the storage node and the above-described wiring, and obtaining highly precise sensor circuit output.

Also, although the example in which the sensor circuit 81 includes the capacitor C2 as the storage capacitor is given in the above-described embodiments, even if a circuit element corresponding to the storage capacitor is not provided in the sensor circuit 81, it is possible for the parasitic capacitance that is generated at the storage node to be used as the storage capacitor. The capacitor C2 is therefore not essential.

INDUSTRIAL APPLICABILITY

The present invention is industrially applicable as a display device having a photosensor in a pixel region of an active matrix substrate.

The invention claimed is:

1. A display device comprising a photosensor in a pixel region of an active matrix substrate,
the photosensor comprising:
a photodetection element that receives incident light;
a storage node that is connected to the photodetection element, the potential of the storage node changing in accordance with an output current from the photodetection element;
reset signal wiring that supplies a reset signal to the photosensor;

readout signal wiring that supplies a readout signal to the photosensor; and a sensor switching element for reading out the potential of the storage node to output wiring as sensor circuit output, the potential of the storage node having changed in accordance with the amount of light received by the photodetection element in a sensing period, the sensing period being from when the reset signal is supplied until when the readout signal is supplied, wherein the potential of wiring having a parasitic capacitance with the storage node is fixed to a predetermined potential at least either one of immediately before the readout signal and immediately before the reset signal.

2. The display device according to claim 1, wherein the wiring having a parasitic capacitance with the storage node is the output wiring.

3. The display device according to claim 2, wherein a video signal having a predetermined level is supplied to the output wiring in order to fix the potential of the output wiring to the predetermined potential.

4. The display device according to claim 1, wherein the wiring having a parasitic capacitance with the storage node is power supply wiring that supplies a power supply voltage to the photosensor in a period in which the readout signal is being supplied, and the power supply wiring also serves as a source line that supplies a video signal to a pixel in the pixel region.

5. The display device according to claim 4, wherein fixing of the potential of the power supply wiring to the predetermined potential is controlled by a signal different from the readout signal.

6. The display device according to claim 1 wherein a video signal having a predetermined level is supplied to the output wiring in order to fix the potential of the output wiring to a first predetermined potential immediately before the readout signal, and a voltage having a predetermined level is supplied to the output wiring in order to fix the potential of the output wiring to a second predetermined potential immediately before the reset signal.

7. The display device according to claim 1, further comprising:

a common substrate opposing the active matrix substrate; and liquid crystal sandwiched between the active matrix substrate and the common substrate.

* * * * *